United States Patent
Yamamoto et al.

(10) Patent No.: US 9,997,954 B2
(45) Date of Patent: Jun. 12, 2018

(54) POWER STORAGE SYSTEM AND POWER STORAGE METHOD

(71) Applicant: FUJIKURA LTD., Tokyo (JP)

(72) Inventors: Kazuhiro Yamamoto, Sakura (JP); Ryoji Yanagimoto, Sakura (JP); Yuji Yamada, Sakura (JP); Kenjiro Yano, Tokyo (JP); Kenichi Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 212 days.

(21) Appl. No.: 15/107,489

(22) PCT Filed: Dec. 26, 2014

(86) PCT No.: PCT/JP2014/084645
§ 371 (c)(1),
(2) Date: Jun. 23, 2016

(87) PCT Pub. No.: WO2015/099158
PCT Pub. Date: Jul. 2, 2015

(65) Prior Publication Data
US 2016/0322859 A1    Nov. 3, 2016

(30) Foreign Application Priority Data

Dec. 27, 2013  (JP) .................................. 2013-272145
Jan. 31, 2014  (JP) .................................. 2014-017346

(51) Int. Cl.
*H02J 9/00* (2006.01)
*H02J 7/35* (2006.01)
(Continued)

(52) U.S. Cl.
CPC ........ *H02J 7/35* (2013.01); *H02J 3/32* (2013.01); *H02J 3/383* (2013.01); *H02J 7/0022* (2013.01);
(Continued)

(58) Field of Classification Search
CPC ........................................................ H02J 9/061
(Continued)

(56) References Cited

U.S. PATENT DOCUMENTS

2004/0138785 A1   7/2004  Emori et al.
2007/0063671 A1*  3/2007  Simpson ............... H02J 7/0013
                                                320/116
(Continued)

FOREIGN PATENT DOCUMENTS

CN    102364810 A    2/2012
EP     1528652 A2    5/2005
(Continued)

OTHER PUBLICATIONS

Office Action of Japanese Application No. 2014-017346 dated Aug. 26, 2014.
(Continued)

*Primary Examiner* — Adi Amrany
(74) *Attorney, Agent, or Firm* — Sughrue Mion, PLLC

(57) ABSTRACT

A power storage system includes: a first storage battery that is configured to be supplied with power generated by a power generation element performing environmental power generation and to supply power to an external load apparatus; a second storage battery that is configured to have a capacity larger than a capacity of the first storage battery, and to supply power to the external load apparatus; a first switch unit that performs switching between an electrical connection state and disconnection state between the first storage battery and the second storage battery; and a first changeover unit that compares a voltage of the first storage battery with a first threshold voltage which is equal to or higher than a voltage causing the external load apparatus to be operated, and controls the first switch unit according to a comparison result.

12 Claims, 17 Drawing Sheets

(51) Int. Cl.
  *H02J 9/06* (2006.01)
  *H02J 7/00* (2006.01)
  *H02J 3/32* (2006.01)
  *H02J 3/38* (2006.01)

(52) U.S. Cl.
  CPC .......... *H02J 7/0024* (2013.01); *H02J 7/0054* (2013.01); *H02J 9/061* (2013.01)

(58) Field of Classification Search
  USPC ......................................................... 307/85
  See application file for complete search history.

(56) References Cited

U.S. PATENT DOCUMENTS

| | | | |
|---|---|---|---|
| 2009/0072781 | A1 | 3/2009 | Takahashi et al. |
| 2010/0000804 | A1* | 1/2010 | Yeh ................. B60K 16/00 180/2.2 |
| 2010/0201195 | A1* | 8/2010 | Maegawa ........... H01M 10/425 307/66 |
| 2011/0210694 | A1* | 9/2011 | Uehashi .................... H02J 3/32 320/101 |
| 2012/0068669 | A1 | 3/2012 | Trainor et al. |
| 2013/0099721 | A1* | 4/2013 | Azzam .................. H02J 7/0063 320/101 |
| 2013/0134946 | A1 | 5/2013 | Nakahara et al. |
| 2016/0016483 | A1* | 1/2016 | Yasunori ................. B60L 11/14 320/162 |
| 2016/0049814 | A1* | 2/2016 | Sugiyama ............ H02J 7/0021 320/128 |
| 2016/0322859 | A1* | 11/2016 | Yamamoto ........... H02J 7/0022 |

FOREIGN PATENT DOCUMENTS

| | | | |
|---|---|---|---|
| GB | 2502190 | A | 11/2013 |
| JP | 2000041336 | A * | 2/2000 |
| JP | 2002-199618 | A | 7/2002 |
| JP | 2009-89585 | A | 4/2009 |
| JP | 2010273519 | A | 12/2010 |
| JP | 2012-108829 | A | 6/2012 |

OTHER PUBLICATIONS

Communication dated Feb. 14, 2017 from the Japanese Patent Office in counterpart Application No. 2015-555063.
Communication dated Sep. 5, 2017, from the European Patent Office in counterpart European Application No. 14873688.7.
Communication dated Nov. 23, 2017 from the State Intellectual Property Office of the P.R.C. in counterpart Chinese application No. 201480070748.7.
Communication dated Apr. 11, 2017 from the Japanese Patent Office in counterpart Application No. 2015-555063.

* cited by examiner

VL:DRIVING POSSIBLE VOLTAGE OF EXTERNAL LOAD APPARATUS
V1:VOLTAGE CAUSING POWER TO BE SUPPLIED TO STORAGE BATTERY B

POWER STORAGE SYSTEM AND POWER STORAGE METHOD

CROSS REFERENCE TO RELATED APPLICATIONS

This application is a National Stage of International Application No. PCT/JP2014/056061 filed Mar. 7, 2014 claiming priority based on Japanese Patent Application No. 2013-113183, filed May 29, 2013, the contents of which are incorporated herein by reference in their entirety.

TECHNICAL FIELD

The present invention relates to a power storage system and a power storage method in which power generated by a power generation element performing environmental power generation is stored in a storage battery, and the power is supplied to an external load apparatus.

BACKGROUND ART

In recent years, energy harvesting (environmental power generation) devices such as a wireless sensor or a remote control switch have attracted attention due to achievement of low power consumption in an electronic circuit or a wireless technique. An energy harvesting device obtains electrical energy from the ambient environment and thus operates without wiring or batteries being replaced. As an energy harvesting device, for example, a low illuminance dye-sensitized solar battery for energy harvesting which is expected to be able to be used in indoor light from a fluorescent lamp or an LED lamp is currently being developed.

Patent Document 1 discloses a power generation system which obtains an appropriate power generation amount required by a solar battery on the basis of the required power, and adjusts a power generation amount of the solar battery according to the obtained power generation amount.

Patent Document 2 discloses a power source device provided with a plurality of power storage portions with different capacities in order to effectively charge the power storage portions with power generated by a solar battery.

Patent Document 3 discloses a power source device provided with a switch circuit which switches between connection to a light power generation portion of a capacitor and connection to a battery of the capacitor.

PRIOR ART DOCUMENTS

Patent Documents

[Patent Document 1] Japanese Unexamined Patent Application, First Publication No. 2012-108829
[Patent Document 2] Japanese Unexamined Patent Application, First Publication No. 2002-199618
[Patent Document 3] Japanese Unexamined Patent Application, First Publication No. 2009-89585

DISCLOSURE OF INVENTION

Problem to be Solved by Invention

Meanwhile, in an environment in which an amount of generated power is small or may be small, there have been attempts to cause a power generation element to generate power, store the generated power in a storage battery, and cause a load apparatus to work by using the stored power. In this case, there are the following problems.

In other words, it is necessary to store power in a storage battery having a corresponding capacity in order to cause the load apparatus to perform continuous work. However, in a case where a storage battery having a large capacity is used, it takes time to store power, and thus there is a problem that the time taken until the load apparatus driven by the storage battery is activated increases.

The power generation systems or the power source devices disclosed in the above Patent Documents 1 to 3 are not able to cope with these problems. Particularly, in the power source devices disclosed in Patent Documents 2 and 3, since a power storage portion having a small capacity or a capacitor having a small capacitance cannot supply power to an external apparatus, power cannot be supplied to the external apparatus until the power storage portion or a battery having a large capacity is sufficiently charged.

The present invention has been made in consideration of the above-described circumstances, and an object of the present invention is to provide a power storage system and a power storage method capable of rapidly raising an output voltage supplied to an external load apparatus even in a case where a storage battery having a large capacity is used.

Means for Solving the Problems

In order to solve the above problems, according to a first aspect of the present invention, a power storage system includes a first storage battery that is configured to be supplied with power generated by a power generation element performing environmental power generation and to supply power to an external load apparatus; a second storage battery that is configured to have a capacity larger than a capacity of the first storage battery, and to supply power to the external load apparatus; a first switch unit that performs switching between an electrical connection state and disconnection state between the first storage battery and the second storage battery; and a first changeover unit that compares the voltage of the first storage battery with a first threshold voltage which is equal to or higher than the voltage causing the external load apparatus to be operated, and controls the first switch unit according to a comparison result, in which, in a case where the voltage of the first storage battery is equal to or lower than the first threshold voltage, the first changeover unit controls the first switch unit so that the first storage battery is disconnected from the second storage battery, and thus power generated by the power generation element is supplied to only the first storage battery, and in which, in a case where the voltage of the first storage battery exceeds the first threshold voltage, the first changeover unit controls the first switch unit so that the first storage battery is connected to the second storage battery, and thus power is supplied to the second storage battery from the first storage battery.

In the power storage system according to the aspect, it is possible to supply power to the external load apparatus from each storage battery by using storage batteries of two types having different capacities. The first changeover unit controls the first switch unit so that power generated by the power generation element is supplied to only the first storage battery until a voltage to which the first storage battery is charged becomes the first threshold voltage. In a case where a voltage of the first storage battery exceeds the first threshold voltage, the first changeover unit controls the first switch unit so that power is supplied from the first storage battery to the second storage battery.

Consequently, the power storage system can rapidly increase the output voltage supplied to the external load apparatus even in a case where a storage battery having a large capacity is used. Particularly, since the first storage battery is connected to the external load apparatus, it is possible to increase the output voltage supplied to the external load apparatus even before the second storage battery having a large capacity is charged.

The power storage system may further include a second switch unit that performs switching between an electrical connection state and disconnection state between the first storage battery and the second storage battery, and the external load apparatus; and a second changeover unit that compares the voltage of the first storage battery with a second threshold voltage, and controls the second switch unit according to a comparison result. In a case where the voltage of the first storage battery is higher than the second threshold voltage, the second changeover unit may control the second switch unit so that the first storage battery and the second storage battery are connected to the external load apparatus, and, in a case where the voltage of the first storage battery is lower than the second threshold voltage, the second changeover unit may control the second switch unit so that the first storage battery and the second storage battery are disconnected from the external load apparatus.

In the power storage system according to the aspect, the second switch unit which switches between an electrical connection state and disconnection state between the first storage battery and the second storage battery, and the external load apparatus is provided. In a case where the voltage of the first storage battery is higher than the second threshold voltage, the second changeover unit brings the second unit into a connection state so that power is supplied from the power storage system to the external load apparatus. In a case where the voltage of the first storage battery is lower than the second threshold voltage, the second changeover unit brings the second switch unit into a disconnection state so that the power storage system is disconnected from the external load apparatus.

Consequently, in the power storage system, in a case where the voltage of the first storage battery is low, such as a case where the power storage device is initially charged, wasteful power consumption is prevented by stopping the supply of power to the external load apparatus, and thus it is possible to quicken charging of the first storage battery.

The second threshold voltage may be set to be a predetermined voltage higher than an operation voltage causing the external load apparatus to be operated, and to be lower than the first threshold voltage.

Consequently, in the power storage system, it is possible to reliably operate the external load apparatus in a case where power is supplied to the external load apparatus.

The first changeover unit may have hysteresis characteristics, and compare the voltage of the first storage battery with the first threshold voltage by using the hysteresis characteristics. In a case where the voltage of the first storage battery exceeds the first threshold voltage, the first changeover unit may control the first switch unit so that the first storage battery is connected to the second storage battery, and, in a case where the first storage battery is connected to the second storage battery, and the voltage of the first storage battery is reduced to a third threshold voltage or lower, the third threshold voltage being a predetermined voltage lower than the first threshold voltage, the first changeover unit may control the first switch unit so that the first storage battery is disconnected from the second storage battery.

In the power storage system according to the aspect, in a case where it is detected that the voltage of the first storage battery exceeds the first threshold voltage, the first changeover unit connects the first storage battery to the second storage battery. Thereafter, power is supplied from the first storage battery to the second storage battery, and thus the voltage of the first storage battery is reduced. In a case where it is detected that the voltage of the first storage battery is reduced to the third threshold voltage or lower, the threshold voltage being a predetermined voltage lower than the first threshold voltage, the first changeover unit disconnects the first storage battery from the second storage battery. In other words, the first changeover unit controls opening and closing of the first switch unit by using the hysteresis characteristics.

Consequently, in the power storage system, it is possible to supply power from the first storage battery to the second storage battery, and also to prevent the voltage of the first storage battery from being reduced to a predetermined voltage or lower.

A hysteresis width between the first threshold voltage and the third threshold voltage in the hysteresis characteristics of the first changeover unit may be set to correspond to a second threshold voltage used to control opening and closing of a second switch unit performing switching between an electrical connection state and disconnection state between the first storage battery and the second storage battery, and the external load apparatus.

Consequently, in the power storage system, it is possible to prevent the voltage of the first storage battery from being reduced to the second threshold voltage or lower when power is supplied from the first storage battery to the second storage battery.

The third threshold voltage may be set to be a predetermined voltage higher than the second threshold voltage.

Consequently, in the power storage system, it is possible to prevent the second switch unit from discontinuously repeating opening and closing when power is supplied from the first storage battery to the second storage battery.

The first switch unit may be provided with a supply circuit that is connected in parallel thereto, and the supply circuit may be configured to prevent a current from flowing through the first storage battery from the second storage battery, and to cause a current to flow toward the external load apparatus from the second storage battery.

Consequently, in the power storage system, it is possible to supply power to the external load apparatus from the second storage battery even in a case where the first switch unit is open.

The power storage system may further include a DC/DC converter that converts an output voltage from the power generation element into a predetermined voltage so that power is supplied to the first storage battery and the second storage battery.

Consequently, in the power storage system, the DC/DC converter can step up an output voltage from the power generation element, and supply the voltage to the storage battery.

The power generation element may be a low illuminance solar battery which can be used in an environment of a predetermined illuminance or lower.

Consequently, in the power storage system, it is possible to rapidly increase the output voltage which is output to the outside even in a case where power output from the low illuminance solar battery is stored by using a storage battery having a large capacity.

The solar battery may be constituted of solar battery cells which are connected in series to each other.

Consequently, in the power storage system, the solar battery can output a necessary voltage.

The solar battery may be a low illuminance dye-sensitized solar battery.

Consequently, in the power storage system, it is possible to rapidly increase the output voltage which is output to the outside even in a case where power output from the low illuminance dye-sensitized solar battery is stored by using a storage battery having a large capacity.

According to a second aspect of the present invention, a power storage method includes providing a power storage system including a first storage battery that is configured to be supplied with power generated by a power generation element performing environmental power generation and to supply power to an external load apparatus, a second storage battery that is configured to have a capacity larger than a capacity of the first storage battery, and to supply power to the external load apparatus, a first switch unit that performs switching between an electrical connection state and disconnection state between the first storage battery and the second storage battery, and a first changeover unit that compares a voltage of the first storage battery with a predetermined first threshold voltage which is equal to or higher than a voltage causing the external load apparatus to be operated, and controls the first switch unit according to a comparison result; causing the first changeover unit to control the first switch unit so that the first storage battery is disconnected from the second storage battery, and thus power generated by the power generation element is supplied to only the first storage battery, in a case where the voltage of the first storage battery is equal to or lower than the first threshold voltage; and causing the first changeover unit to control the first switch unit so that the first storage battery is connected to the second storage battery, and thus power is supplied to the second storage battery from the first storage battery, in a case where the voltage of the first storage battery exceeds the first threshold voltage.

Consequently, the power storage system can rapidly increase the output voltage supplied to the external load apparatus even in a case where a storage battery having a large capacity is used. Particularly, since the first storage battery is connected to the external load apparatus, it is possible to increase the output voltage supplied to the external load apparatus even before the second storage battery having a large capacity is charged.

Effects of the Invention

According to the power storage system according to the aspects of the present invention, it is possible to rapidly increase the output voltage supplied to an external load apparatus even in a case where a storage battery having a large capacity is used.

EMBODIMENTS FOR CARRYING OUT THE INVENTION

An embodiment of the present invention will be described with reference to the accompanying drawings.

[Example of Environment Monitoring System Using Power Storage System]

Figure 1:
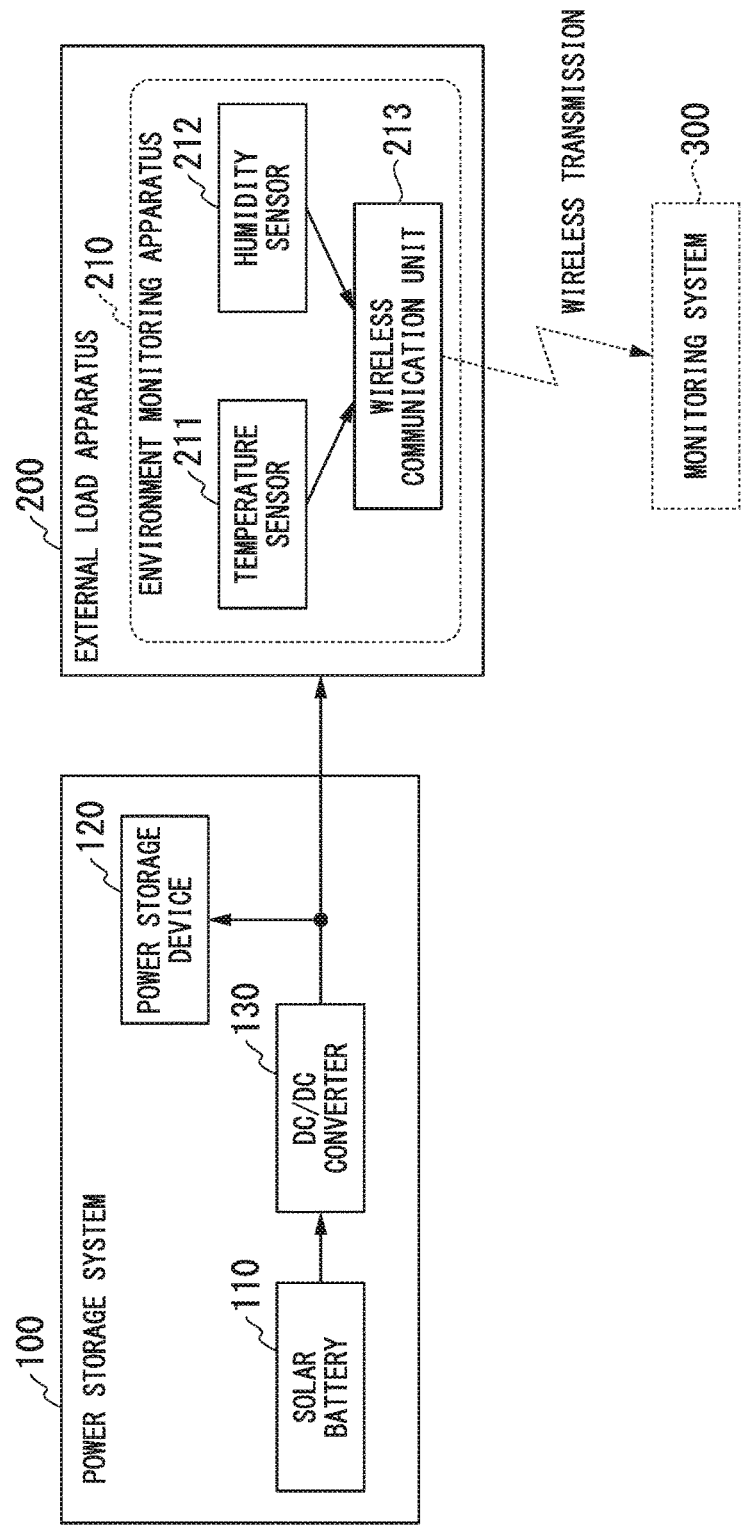
FIG. 1 is a configuration diagram showing a schematic configuration of an environment monitoring system in which a power storage system according to an embodiment of the present invention is used.

FIG. 1 is a configuration diagram showing a schematic configuration of an environment monitoring system in which a power storage system according to an embodiment of the present invention is used. As shown in FIG. 1, an environment monitoring system 1 includes a power storage system 100 which power generated by a power generation element performing environmental power generation is stored in a storage battery, and an external load apparatus 200 to which power is supplied from the power storage system 100. The external load apparatus 200 may be, for example, an environment monitoring apparatus 210 which functions as a wireless sensor operated without wiring or batteries being replaced.

The environment monitoring apparatus 210 is provided with a temperature sensor 211 which measures the temperature in a room such as an office, and a humidity sensor 212 which measures the humidity in the room. The environment monitoring apparatus 210 periodically wirelessly transmits information regarding the indoor temperature measured by the temperature sensor 211 and information regarding the indoor humidity measured by the humidity sensor 212, to an external monitoring system 300 via a wireless communication unit 213. In the example shown in FIG. 1, the environment monitoring apparatus 210 is provided with the temperature sensor 211 and the humidity sensor 212, but may be provided with sensors detecting information regarding other environments. The information regarding other environments is, for example, the concentration of $CO_2$, vibration, the water level, the illuminance, a voltage, a current, a voice, and an image.

The environment monitoring system 1 provided with such sensors can also transmit information regarding an environment and can rapidly increase the output voltage supplied to the external load apparatus even in a case where a storage battery having a large capacity is used.

The power storage system 100 which supplies power to the external load apparatus 200 includes a solar battery 110 which is a power generation element, a power storage device 120, and a DC/DC converter 130. The solar battery 110 is a low illuminance solar battery, and is used at the illuminance of 10000 Lux or less, for example. In the power storage system 100, power generated by the solar battery 110 is supplied to the power storage device 120 via the DC/DC converter 130, and the power is stored in the power storage device 120. The power storage system 100 supplies the power stored in the power storage device 120 to the external load apparatus 200. Details of a configuration and an operation of the power storage system 100 will be described later. In the example shown in FIG. 1, the solar battery 110 is described as a power generation element, but the present invention is not limited thereto. The power generation element may be a power generation element which can perform environmental power generation. Here, power generation using environments other than light is power generation using, for example, heat, vibration, wind power, and electric waves.

Figure 2A:
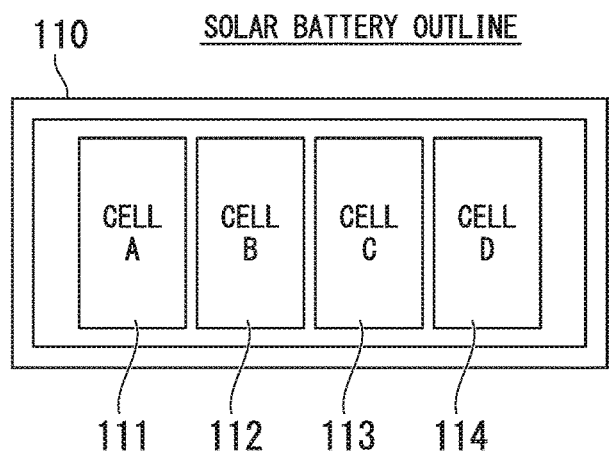
FIG. 2A is an explanatory diagram showing an outline of a solar battery and a state in which solar battery cells communicate with each other.
Figure 2B:
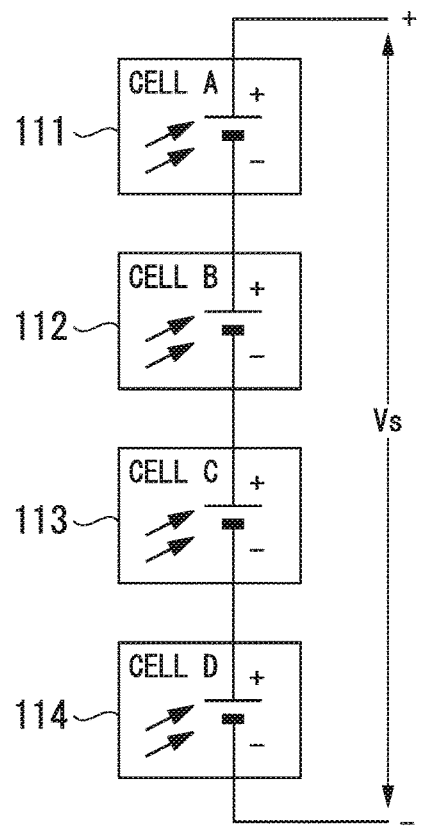
FIG. 2B is an explanatory diagram showing an outline of a solar battery and a state in which solar battery cells are connected to each other.

FIGS. 2A and 2B are explanatory diagrams showing an outline of the storage battery and a state in which storage battery cells are connected to each other. As shown in a plan view of FIG. 2A, four solar battery cells A111, B112, C113 and D114 are arranged in a planar shape on a light reception surface of the solar battery 110. The four solar battery cells A111, B112, C113 and D114 are configured to be connected in series to each other so as to obtain a predetermined output voltage Vs, as shown in FIG. 2B.

In the solar battery 110 shown in FIGS. 2A and 2B, an example is shown in which the four solar battery cells are connected in series to each other, but the number of solar battery cells connected in series to each other is not limited. The number of solar battery cells is selected so that a voltage output to the DC/DC converter 130 becomes a voltage causing a boost operation of predetermined efficiency or more in the DC/DC converter 130. For example, in a case where the solar battery cell is a low illuminance dye-sensitized solar battery, the number of solar battery cells connected in series to each other is preferably at least three.

Meanwhile, in a case where the solar battery 110 is used as an input power source, if the external load apparatus 200 is to be continuously driven, it is necessary to store an amount of power to be consumed at night at which illumination does not reach the solar battery, in a storage battery. Further, in a case where the use of the solar battery in a room such as an office is taken into consideration, it is necessary to store an amount of power to be consumed on Saturdays, Sundays, and national holidays. In order to increase power stored in the storage battery, a method of increasing the capacity of the storage battery or charging the storage battery to a high voltage may be used. However, since it takes time to charge the storage battery in either method, time is lengthened until the external load apparatus 200 can be driven.

In the power storage system according to the present embodiment, in order to solve the above problem, two types of storage battery A121 and storage battery B122 having different capacities, and a switch unit 140 (first switch unit) as a switching mechanism are used.

Figure 3:
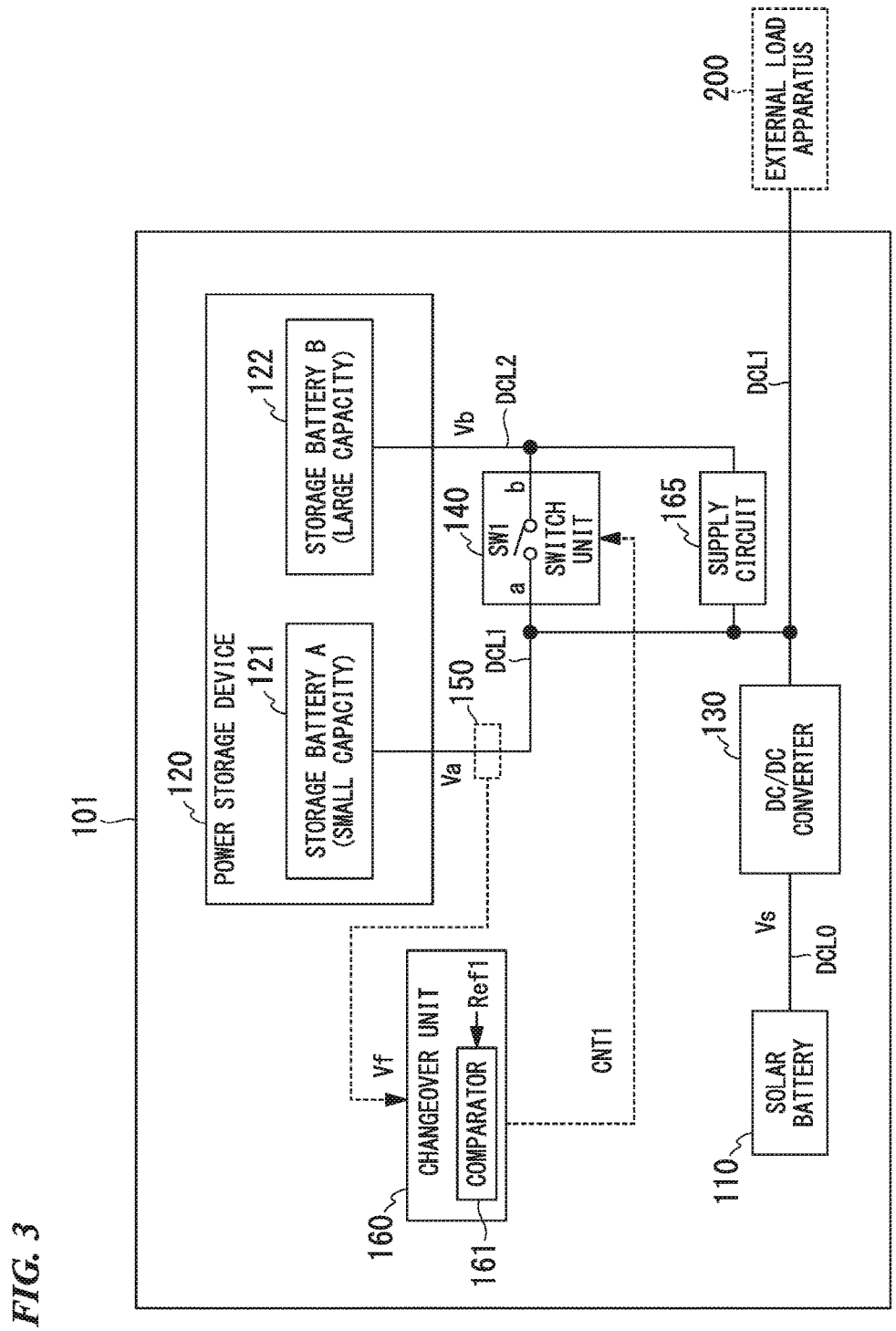
FIG. 3 is a configuration diagram showing a configuration example of a power storage system 101.

FIG. 3 is a configuration diagram showing a configuration of a power storage system 101. The power storage system 101 shown in FIG. 3 includes the solar battery 110, the power storage device 120, the DC/DC converter 130, the switch unit 140, a voltage detection unit 150, a changeover unit 160 (first changeover unit), and a supply circuit 165.

The solar battery 110 is a low illuminance solar battery shown in FIGS. 2A and 2B. The power storage device 120 is constituted of a secondary battery, a capacitor, or the like corresponding to use for energy harvesting, and includes the storage battery A121 having a small capacity and the storage battery B122 having a large capacity.

The magnitude of the capacity of the storage battery A121 is set on the basis of a time period until a voltage causing the external load apparatus 200 to be driven is increased from the supply of power from the solar battery 110, the extent to which a voltage of the storage battery A121 drops when power is supplied from the storage battery A121 to the storage battery B122, and a time period in which the external load apparatus 200 can be continuously driven with power from the storage battery A121.

The magnitude of the capacity of the storage battery B122 is set on the basis of a load capacity of the external load apparatus 200, and a time period in which the external load apparatus 200 can be continuously driven. For example, a capacity ratio of the storage battery B122 to the storage battery A121 is set to be about several times to several tens of times.

Figure 4:
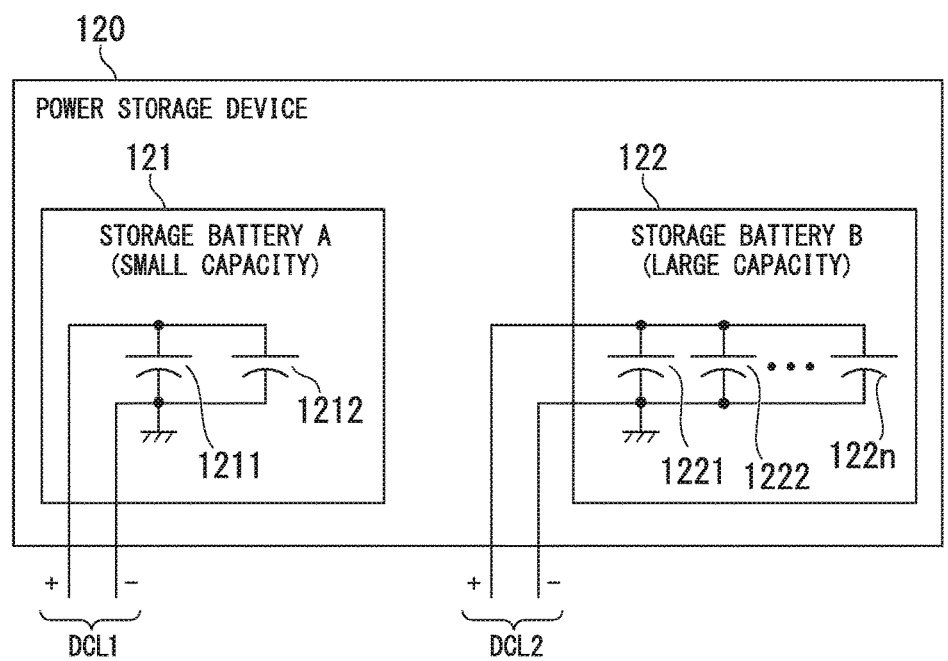
FIG. 4 is a configuration diagram showing an example in which each of a storage battery A121 and a storage battery B122 is constituted of a plurality of storage batteries.

Each of the storage battery A121 and the storage battery B122 may be constituted of a single battery, or may be constituted of a plurality of batteries as shown in FIG. 4. In the example shown in FIG. 4, for example, the storage battery A121 is constituted of two storage batteries including a storage battery 1211 and a storage battery 1212, and the storage battery B122 is constituted of n storage batteries including a storage battery 1221, a storage battery 1222, . . . , and a storage battery 122n. In other words, each of the storage battery A121 and the storage battery B122 may be constituted of any number of storage batteries.

As shown in FIG. 3, an output side of the solar battery 110 is connected to an input side of the DC/DC converter (a boost converter) 130 via a power supply line DCL0. The DC/DC converter 130 is constituted of a DC/DC converter device or the like, receives the output voltage Vs from the solar battery 110, and steps up the voltage Vs to a predetermined voltage which is then output to a power supply line DCL1. In the present embodiment, the DC/DC converter 130 is provided to step up a voltage, but a voltage may be stepped down by using the DC/DC converter 130 as necessary.

An output side of the DC/DC converter 130 is connected to the storage battery A121 via the power supply line DCL1, and is also connected to one terminal a of the switch unit 140. The other terminal b of the switch unit 140 is connected to the storage battery B122 via a power supply line DCL2.

The switch unit 140 turns on (closed state) or off (open state) an internal switch SW1 according to instruction content of a control signal CNT1 input from the changeover unit 160, and thus performs switching between an electrical connection state and disconnection state between the power supply line DCL1 and the power supply line DCL2. In other words, if the switch SW1 is turned on, the storage battery A121 and the storage battery B122 are electrically connected in parallel to each other via the switch SW1. If the switch SW1 is turned off, the storage battery A121 and the storage battery B122 are electrically disconnected from each other.

FIG. 3 shows an example in which the switch unit 140 is constituted of the switch SW1 using a mechanical contact point. However, actually, the switch SW1 includes a semiconductor switch including a semiconductor switching element such as a metal oxide semiconductor field effect transistor (MOSFET) or an insulated gate bipolar transistor (IGBT).

In FIG. 3, each of the power supply line DCL0, the power supply line DCL1, and the power supply line DCL2 is shown as a single line, but, actually, includes a positive side power supply line and a negative side power supply line (a ground line). The switch SW1 of the switch unit 140 may be a one-circuit switch performing switching a connection state and a disconnection state of, for example, only the positive side power supply line, of the positive side power supply line and the negative side power supply line, or may be a two-circuit switch performing switching a connection state and a disconnection state of both of the positive side power supply line and the negative side power supply line. This is also the same for FIGS. 9, 14 and 17 which will be described later.

The voltage detection unit 150 is constituted of, for example, a resistance voltage-dividing circuit, and detects a voltage of the power supply line DCL1. The voltage of the power supply line DCL1 is the same as a voltage Va of the storage battery A121. Thus, the voltage detection unit 150 detects the voltage of the power supply line DCL1, and thus detects the voltage Va which is a charging voltage of the storage battery A121. The voltage detection unit 150 outputs a detection signal Vf for the voltage Va of the storage battery A121 to the changeover unit 160.

The changeover unit 160 includes a comparator 161. The comparator 161 compares a predetermined reference voltage Ref1 generated by a reference voltage generation circuit (not shown) with the detection signal Vf for the voltage Va of the storage battery A121 which is input from the voltage detection unit 150. The reference voltage Ref1 corresponds to a voltage V1 (a first threshold voltage) of the storage battery A121, and is used to determine whether or not the voltage Va of the storage battery A121 exceeds the voltage V1 causing power to be supplied to the storage battery B122.

The changeover unit 160 outputs the control signal CNT1 for turning on and off (closing and opening) the switch SW1 of the switch unit 140 to the switch unit 140 in response to a comparison result in the comparator 161. The switch unit 140 performs an opening or closing operation of the switch SW1 on the basis of the control signal CNT1.

In other words, in a case where the voltage Va of the storage battery A121 is lower than the voltage V1, the changeover unit 160 turns off the switch SW1 of the switch unit 140 by using the control signal CNT1, and thus the storage battery A121 is electrically disconnected from the storage battery B122. Consequently, power generated by the solar battery 110 is supplied to only the storage battery A121 via the DC/DC converter 130.

In a case where the voltage Va of the storage battery A121 exceeds the voltage V1, The changeover unit 160 turns on the switch SW1, and thus the storage battery A121 is connected in parallel to the storage battery B122. As a result, power is supplied to the storage battery B122 by electric charge accumulated in the storage battery A121, or by both of power output from the DC/DC converter 130 and electric charge accumulated in storage battery A121.

When power is supplied to the storage battery B122, power output from the DC/DC converter 130 is considerably low, and thus the power is mainly supplied from the storage battery A121 to the storage battery B122. Therefore, the following description will be provided assuming that the supply of power to the storage battery B122 is performed from the storage battery A121.

The comparator 161 of the changeover unit 160 performs determination by using hysteresis characteristics when comparing the magnitudes of the detection signal Vf for the voltage Va of the storage battery A121 and the reference voltage Ref1 with each other. In other words, after detecting that the voltage Va of the storage battery A121 exceeds the voltage V1, the comparator 161 determines that the voltage Va of the storage battery A121 is equal to or lower than the voltage V1 when the voltage Va is reduced to a voltage V1' (=V1−ΔV) which is lower than the voltage V1 by a predetermined voltage ΔV.

Therefore, the changeover unit 160 detects that the voltage Va of the storage battery A121 exceeds the voltage V1, temporarily outputs the control signal CNT1 for turning on the switch SW1, and then continuously outputs the control signal CNT1 for turning on SW1 until the voltage Va is reduced to the voltage V1' (third threshold voltage).

The voltage V1' is set to be lower than the voltage V1 by a predetermined voltage, and to be higher than a driving possible voltage VL of the external load apparatus 200 by a predetermined voltage (V1'>VL). In other words, the voltage V1 is also set to be higher than the driving possible voltage VL of the external load apparatus 200 (V1>V1'>VL). Consequently, it is possible to prevent the DC/DC converter from being brought into a cold start mode.

The term "driving possible voltage VL" used in the present specification is a voltage which is higher than an operation voltage Vout causing the external load apparatus 200 to be actually operated, by a predetermined voltage ΔVo. In other words, the driving possible voltage VL is a voltage having a margin relative to the operation voltage Vout. In the following description, the "driving possible voltage VL" or the "voltage VL" indicates a voltage "operation voltage Vout+ΔVo" which is higher than the operation voltage Vout causing the external load apparatus 200 to be actually operated by the predetermined voltage ΔVo.

In a case where there is no supply circuit 165, even if the storage battery B122 has been charged to a predetermined amount, power cannot be supplied to the external load apparatus 200 from the storage battery B122 if the switch SW1 is turned off. However, since the power storage system 101 is provided with the supply circuit 165, in a case where a predetermined amount of electric charge is accumulated in the storage battery B122, power can be supplied to the external load apparatus 200 from the storage battery B122. Thus, in a case where the external load apparatus 200 cannot be driven only with a charging amount in the storage battery A121, or a case where a load of the storage battery A121 is large, power can be supplied to the external load apparatus 200 from the storage battery B122. Therefore, it is possible to appropriately drive the external load apparatus 200. The supply circuit 165 does not supply power to the storage battery A121. For example, the supply circuit 165 may be constituted by using a diode.

Figure 5:
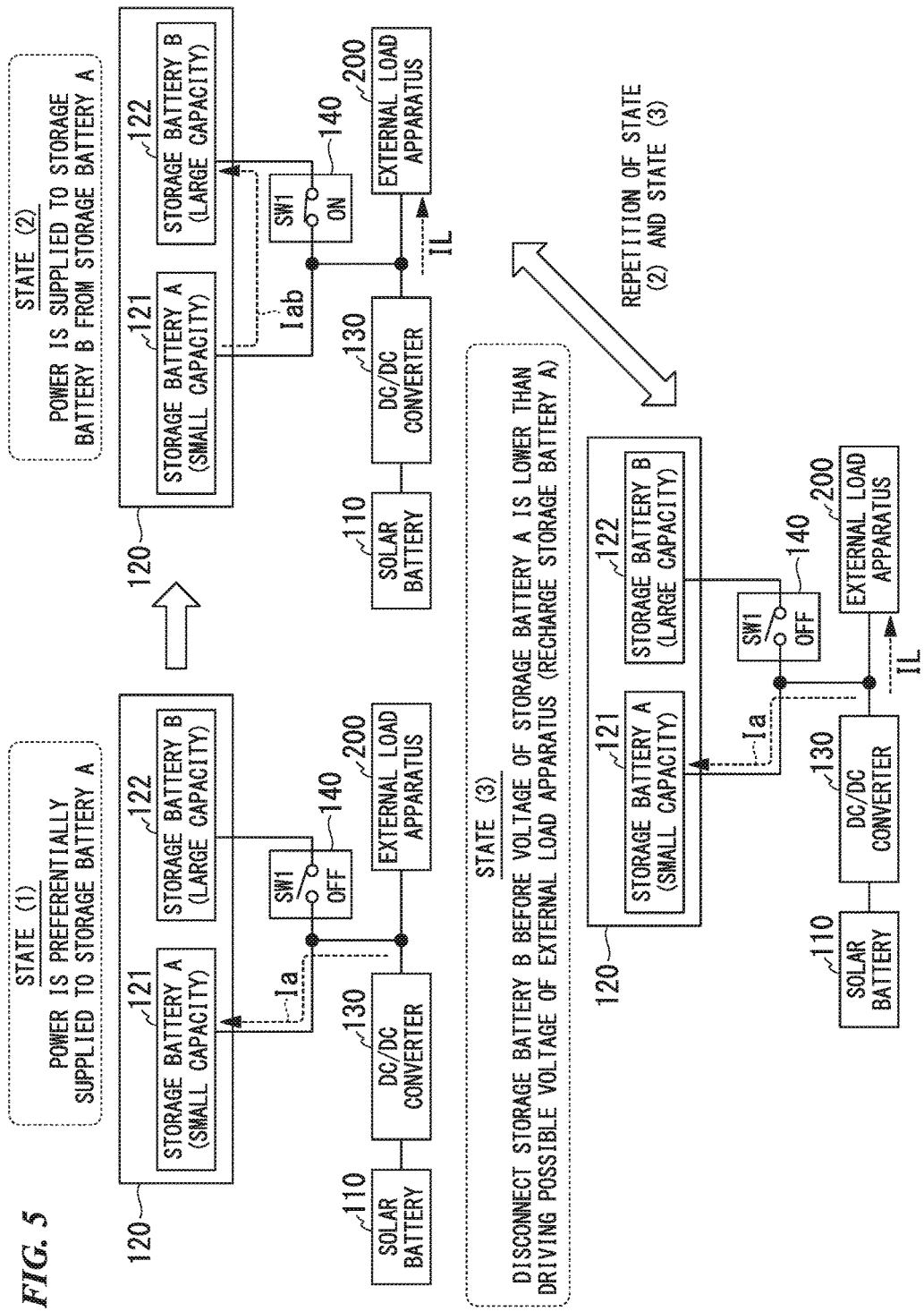
FIG. 5 is an explanatory diagram showing an aspect of a charging operation of the storage battery A121 and the storage battery B122.

FIG. 5 is an explanatory diagram showing an embodiment of a charging operation of the storage battery A121 and the storage battery B122.

Hereinafter, with reference to FIG. 5, a description will be provided of an embodiment of a charging operation of the storage battery A121 and the storage battery B122.

In a case where power is initially supplied to the power storage device 120, that is, both of the storage battery A121 and the storage battery B122 are not charged, first, as shown in a state (1), the switch SW1 of the switch unit 140 is turned off. Consequently, a charging current Ia flows through only the storage battery A121 from the DC/DC converter 130, and thus the storage battery A121 is preferentially charged.

In a case where the charging of the storage battery A121 progresses, and thus a voltage of the storage battery A121 increases to the voltage V1 causing power to be supplied to the storage battery B122, the switch SW1 of the switch unit 140 is turned on as shown in a state (2). Consequently, a charging current Iab flows from the storage battery A121 to the storage battery B122 due to electric charge accumulated in the storage battery A121, and thus power is supplied to the storage battery B122.

Thereafter, if the current Iab flows from the storage battery A121 to the storage battery B122, the voltage Va of the storage battery A121 is likely to be reduced to a balanced voltage between the storage battery A121 and the storage battery B122. Thus, the changeover unit 160 turns off the switch SW1 of the switch unit 140 as shown in a state (3) before the voltage Va of the storage battery A121 becomes lower than the driving possible voltage VL (=operation voltage Vout+ΔVo) of the external load apparatus 200, that is, the voltage of the storage battery A121 is reduced to the voltage V1' (V1>V1'>VL), and thus the storage battery B122 is electrically disconnected from the storage battery A121. Detection of the voltage of the storage battery A121 being reduced to the voltage V1' is performed by using the above-described hysteresis characteristics of the comparator 161. Thus, the voltage Va of the storage battery A121 changes between the voltage V1 and the voltage V1'.

Thereafter, the state (2) and the state (3) are repeated, and, thus, in the power storage system 101, a current IL is made to flow through the external load apparatus 200 so that the external load apparatus 200 is driven, and power can also be stored in the storage battery B122. As mentioned above, in the power storage system 101, power storage in the storage battery B122 progresses by repeating the state (2) and the state (3). Consequently, the storage battery B122 can be charged so that the external load apparatus 200 can be continuously driven even at night or on holidays.

Figure 6:
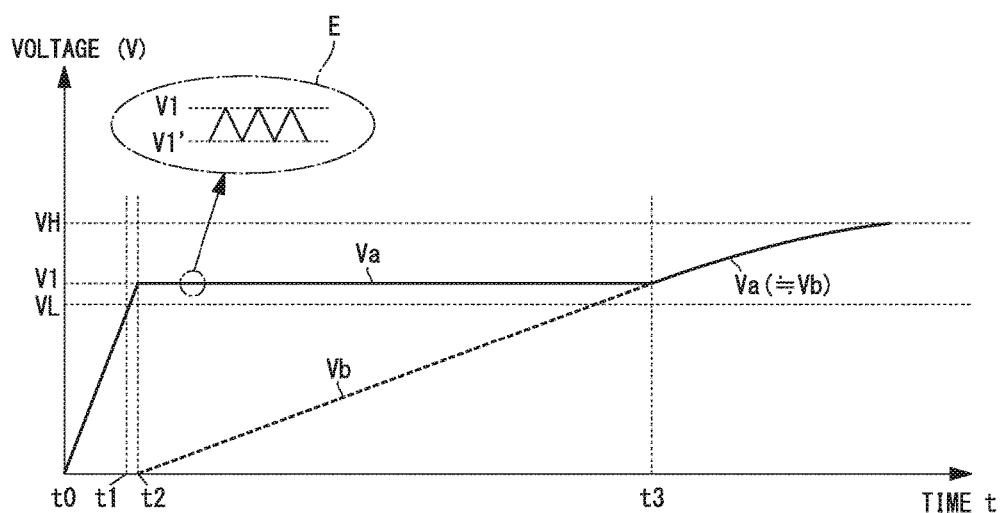
FIG. 6 is an explanatory diagram showing an image of changes in voltages of the storage battery A121 and the storage battery B122.

FIG. 6 is an explanatory diagram showing an image of changes in voltages of the storage battery A121 and the storage battery B122. In FIG. 6, a transverse axis expresses elapse of time t, and a longitudinal axis expresses a voltage. FIG. 6 shows an embodiment of a temporal change in the voltage Va of the storage battery A121 and an embodiment of a temporal change in the voltage Vb of the storage battery B122.

At a time point t0 in FIG. 6, charging of the power storage device 120 is started from the solar battery 110 via the DC/DC converter 130. When the charging is started at the time point t0, as shown in the state (1) in FIG. 5, the changeover unit 160 turns off the switch SW1 of the switch unit 140 so that the supply of power to only the storage battery A121 starts.

Successively, if the voltage Va of the storage battery A121 gradually increases between the time point t0 and a time point t1, and reaches the driving possible voltage VL of the external load apparatus 200 at the time point t1, the external load apparatus 200 is activated.

The external load apparatus 200 is, for example, the above-described environment monitoring apparatus 210, and the environment monitoring apparatus 210 periodically transmits temperature information, humidity information, or the like, outside in a wireless manner.

If the voltage Va of the storage battery A121 increases to the voltage V1 from the time point t1 to a time point t2 after the external load apparatus 200 is activated, the changeover unit 160 turns on the switch SW1 of the switch unit 140 so that power is supplied to the storage battery B122 due to electric charge accumulated in the storage battery A121.

In a case where power is supplied from the storage battery A121 to the storage battery B122, the voltage Va of the storage battery A121 is likely to be reduced to a balanced voltage between the storage battery A121 and the storage battery B122. Thus, the changeover unit 160 turns off the switch SW1 before the voltage Va of the storage battery A121 becomes lower than the driving possible voltage VL of the external load apparatus 200, that is, the voltage of the storage battery A121 is reduced to the voltage V1' (V1>V1'>VL), and thus the storage battery B122 is electrically disconnected from the storage battery A121. In a case where the voltage Va of the storage battery A121 exceeds the voltage V1 again after the switch SW1 is turned off, the changeover unit 160 turns on the switch SW1 again, and thus power is supplied from the storage battery A121 to the storage battery B122. In other words, the changeover unit 160 supplies power from the storage battery A121 to the storage battery B122 while repeatedly performing the turning-on and turning-off operations of the switch SW1.

Therefore, the voltage Va of the storage battery A121 becomes a voltage which changes between the voltage V1 and the voltage V1' as enlarged and indicated in a portion E surrounded by a dashed line in FIG. 6.

The storage battery B122 is charged after the time point t2, and thus the voltage Vb of the storage battery B122 gradually increases.

At a time point t3, the charging is performed until the voltage Vb of the storage battery B122 is nearly the same as the voltage of the storage battery A121. After the time point t3, power can be supplied to the external load apparatus 200 from the storage battery A121 and the storage battery B122.

If the voltages of the storage battery A121 and the storage battery B122 become a voltage VH, the DC/DC converter 130 stops outputting so as to prevent the storage battery A121 and the storage battery B122 from being overcharged, and the supply of power to the storage battery A121 and the storage battery B122 is also stopped.

Figure 7:
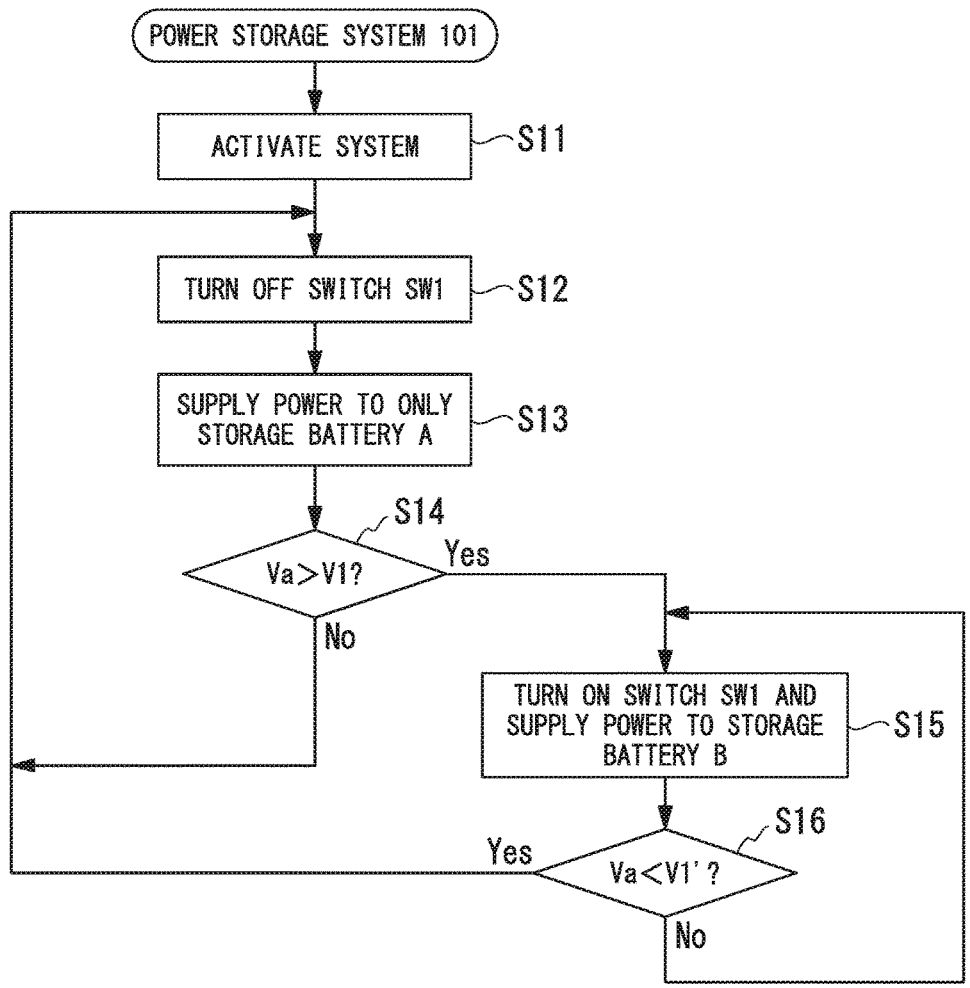
FIG. 7 is a flowchart showing a flow of processes in the power storage system 101.

FIG. 7 is a flowchart showing a flow of processes in the power storage system 101, and is a flowchart showing a flow of the above-described operations in the power storage system 101.

Hereinafter, with reference to FIG. 7, the flow of the processes will be described.

First, it is assumed that the storage battery A121 and the storage battery B122 are not charged. If the power storage system 101 is activated (step S11), the changeover unit 160 turns off the switch SW1 of the switch unit 140 (step S12). The solar battery 110 starts the supply of power to only the storage battery A121 via the DC/DC converter 130 (step S13).

Successively, power is supplied to the storage battery A121, and thus the voltage Va of the storage battery A121 increases. The comparator 161 of the changeover unit 160 determines whether or not the voltage Va of the storage battery A121 exceeds the voltage V1 causing power to be supplied to the storage battery B122 (step S14).

In a case where it is determined that the voltage Va of the storage battery A121 exceeds the voltage V1 in step S14 (step S14: Yes), the flow proceeds to a process in step S15. In step S15, the changeover unit 160 turns on the switch SW1 of the switch unit 140, so that the supply of power from the storage battery A121 to the storage battery B122 is started. Power is supplied from the storage battery A121 to the storage battery B122, and thus the voltage Va of the storage battery A121 decreases.

Next, the comparator 161 of the changeover unit 160 determines whether or not the voltage Va of the storage battery A121 is lower than the voltage V1' (=V1−ΔV) (step S16).

In a case where it is determined that the voltage Va of the storage battery A121 is not lower than the voltage V1' in step S16 (step S16: No), the changeover unit 160 returns to the process in step S15, and continues to supply power to the storage battery B122 from the storage battery A121.

On the other hand, in a case where it is determined that the voltage Va of the storage battery A121 is lower than the voltage V1' in step S16 (step S16: Yes), the changeover unit 160 returns to the process in step S12, and turns off the switch SW1 of the switch unit 140 so that the supply of power to only the storage battery A121 starts again.

The power storage system 101 can rapidly increase a voltage output to the external load apparatus 200 due to the flow of the processes even in a case where a storage battery having a large capacity is used. It is possible to store power in the storage battery B122 while driving the external load apparatus 200 in the power storage system 101.

Figure 8:
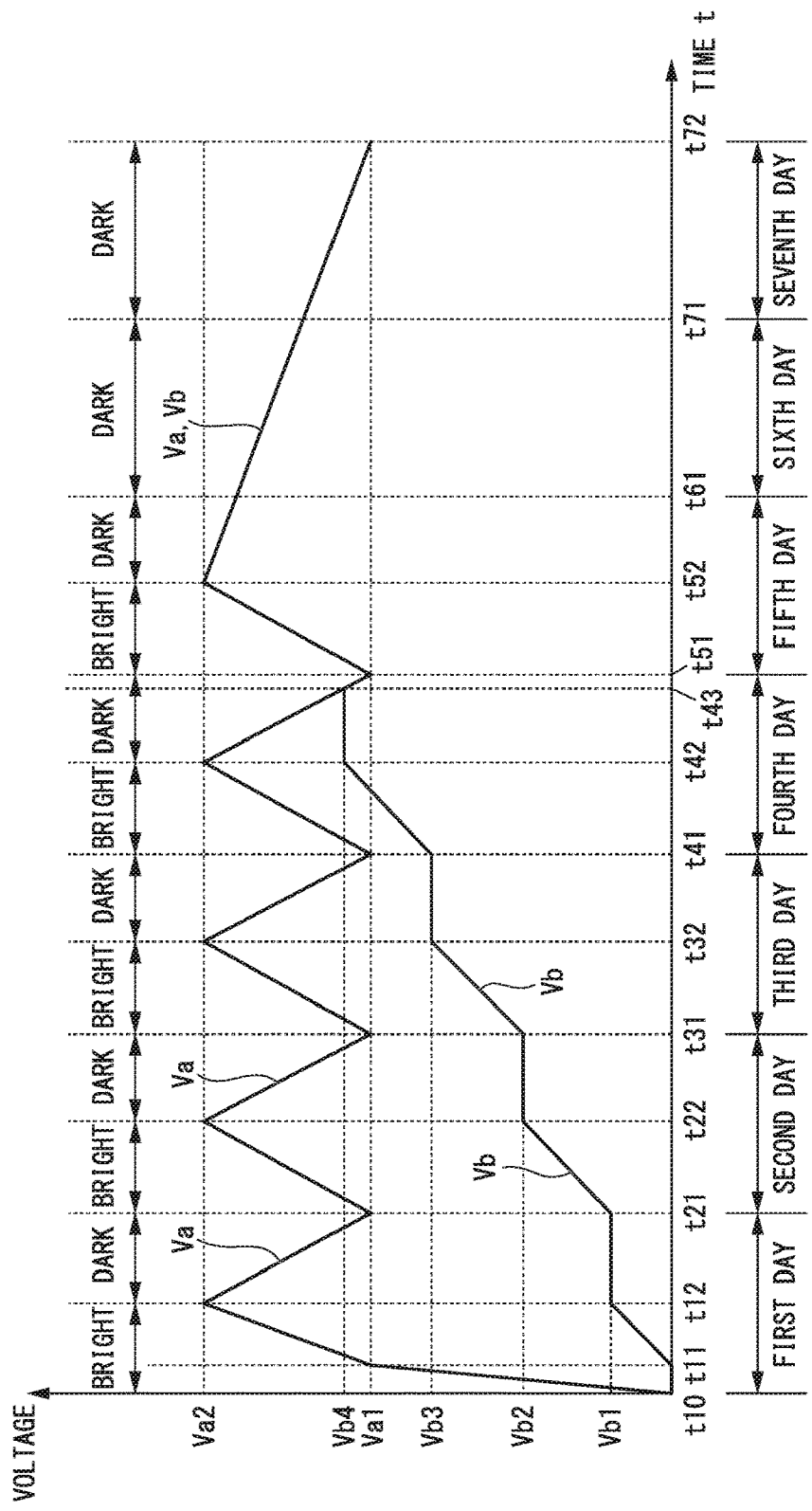
FIG. 8 is an image diagram showing an example in which the power storage system 101 is operated on a weekly basis.

FIG. 8 is an image diagram showing an example in which the power storage system 101 is operated on a weekly basis. In the example shown in FIG. 8, a transverse axis expresses elapse of time t, and a longitudinal axis expresses a voltage. The image shows an embodiment of voltage changes regarding the voltage Va of the storage battery A121 and the voltage Vb of the storage battery B122.

FIG. 8 does not show specific change characteristics of the voltages of the storage battery A121 and the storage battery B122 but conceptually shows an embodiment of charging of the storage battery A121 and the storage battery B122. In other words, FIG. 8 conceptually shows the tendency of voltage changes in the storage battery A121 and the storage battery B122 on a weekly basis (from Monday to Sunday) in a case where a "bright" period in which the inside of an office is bright due to a lamp or incidence of external light and a "dark" period in which the indoor lamp is put off and thus the inside thereof is dark are repeated daily.

Hereinafter, with reference to FIG. 8, a description will be provided of a summary of changes in the voltage Va of the storage battery A121 and the voltage Vb of the storage battery B122 on a weekly basis.

First, it is assumed that both of the storage battery A121 and the storage battery B122 are not charged at an initial time (time point t10) on the first day. At the time point t10, the inside of the office is bright due to the lamp or external light, and the supply of power to the storage battery A121 from the solar battery 110 is started after the time point t10.

Successively, if the voltage Va of the storage battery A121 gradually increases, and the voltage Va of the storage battery A121 becomes a voltage Va1 at a time point t11, the supply of power to the storage battery B122 is started, and thus the voltage Vb of the storage battery B122 starts to increase.

Next, power is continuously supplied to the storage battery A121 and the storage battery B122 from the time point t11 to a time point t12, that is, until the lamp or the like of the office is put off and thus the "dark" period occurs at the time point t12, and thus the voltage Va of the storage battery A121 increases to a voltage Va2 and the voltage of the storage battery B122 increases to a voltage Vb1 at the time point t12.

At the time point t12, if the lamp or the like of the office is put off, thus the office becomes dark, and the "dark" period occurs, power is not supplied from the solar battery 110. During the "dark" period from the time point t12 to a time point t21 at which the lamp is lighted on the second day, power is supplied from the storage battery A121 to the external load apparatus 200, and thus the voltage Va of the storage battery A121 gradually decreases after the time point t12. The supply of power to the storage battery B122 is stopped, and thus the voltage of the storage battery B122 becomes a constant voltage as the voltage Vb1. The voltage of the storage battery A121 is reduced to the voltage Va1 at the time point t21.

The storage battery A121 is set to supply the voltage Va1 to the external load apparatus 200 so as to continuously drive the external load apparatus 200 even in a state in which the voltage Va of the storage battery A121 is reduced to the voltage Va1. In other words, a charging capacity of the storage battery A121 is set to drive the external load apparatus 200 in the "dark" period in which the lamp or the like of the office is put off, and the office becomes dark.

As mentioned above, in the power storage system 101, the supply of power to the storage battery A121 and the supply of power to the storage battery B122 are performed in the "bright" period, and power is supplied from the storage battery A121 to the external load apparatus 200 and power stops being supplied to the storage battery B122 in the "dark" period.

Next, in the same manner for the second day, in the "bright" period from the time point t21 to a time point t22 on the second day, power is supplied to the storage battery A121 and the storage battery B122, and the voltage of the storage battery B122 increases to a voltage Vb2. Similarly, in the "bright" period from a time point t31 to a time point t32 on the third day, power is supplied to the storage battery A121 and the storage battery B122, and the voltage of the storage battery B122 increases to a voltage Vb3. Similarly, in the "bright" period from a time point t41 to a time point t42 on the fourth day, power is supplied to the storage battery A121 and the storage battery B122, and the voltage of the storage battery B122 increases to a voltage Vb4.

Next, in the "dark" period from the time point t42 on the fourth day to a time point t51 on the fifth day, power is supplied from the storage battery A121 to the external load apparatus 200 so that the voltage Va of the storage battery A121 gradually decreases, and thus the voltage Va of the storage battery A121 becomes the same as the voltage Vb of the storage battery B122 at a time point t43.

After the time point t43 on the fourth day, the switch SW1 of the switch unit 140 is continuously in a turned-on state, and the voltage of the storage battery A121 and the voltage of the storage battery B122 change to the same voltage (Va≅Vb).

The "dark" period occurs from a time point t52 on the fifth day. A period from the time point t52 on the fifth day to a time point t61, a period from the time point t61 on the sixth day which is a holiday to a time point t71, and a period from the time point t71 on the seventh day which is also a holiday to a time point t72 are all the "dark" periods. In the "dark"

period from the time point t52 to the time point t72, power is supplied to the external load apparatus 200 from both of the storage battery A121 and the storage battery B122.

In a case where power is supplied from the storage battery A121 to the storage battery B122, the voltage Va of the storage battery A121 is higher than the voltage of the storage battery B122 by a voltage (for example, approximately 0.3 V) reduced in a semiconductor element forming the switch SW1 of the switch unit 140. Conversely, in a case where power is supplied from the storage battery B122 to the power supply line DCL1, the voltage Va of the storage battery A121 is lower than the voltage Vb of the storage battery B122 by the voltage reduced in the semiconductor element forming the switch SW1.

Thus, in a case where the voltage Va of the storage battery A121 is higher than the voltage of the storage battery B122 even in a state in which the switch SW1 of the switch unit 140 is in a turned-on state, electric charge of the storage battery A121 is preferentially supplied to the external load apparatus 200. If the electric charge accumulated in the storage battery A121 is reduced, and thus the voltage Va of the storage battery A121 decreases, the storage battery A121 is supplied with electric charge from the storage battery B122. Consequently, power is supplied to the external load apparatus 200 from the storage battery A121. Alternatively, power is directly supplied to the external load apparatus 200 from the storage battery B122 via the switch unit 140 and the power supply line DCL1.

As described above, in a case where the power storage system 101 is operated on a weekly basis, the storage battery B122 can be charged on weekdays (the first day to the fifth day), and power stored in the storage battery B122 can be used on holidays (the sixth day and the seventh day).

Figure 9:
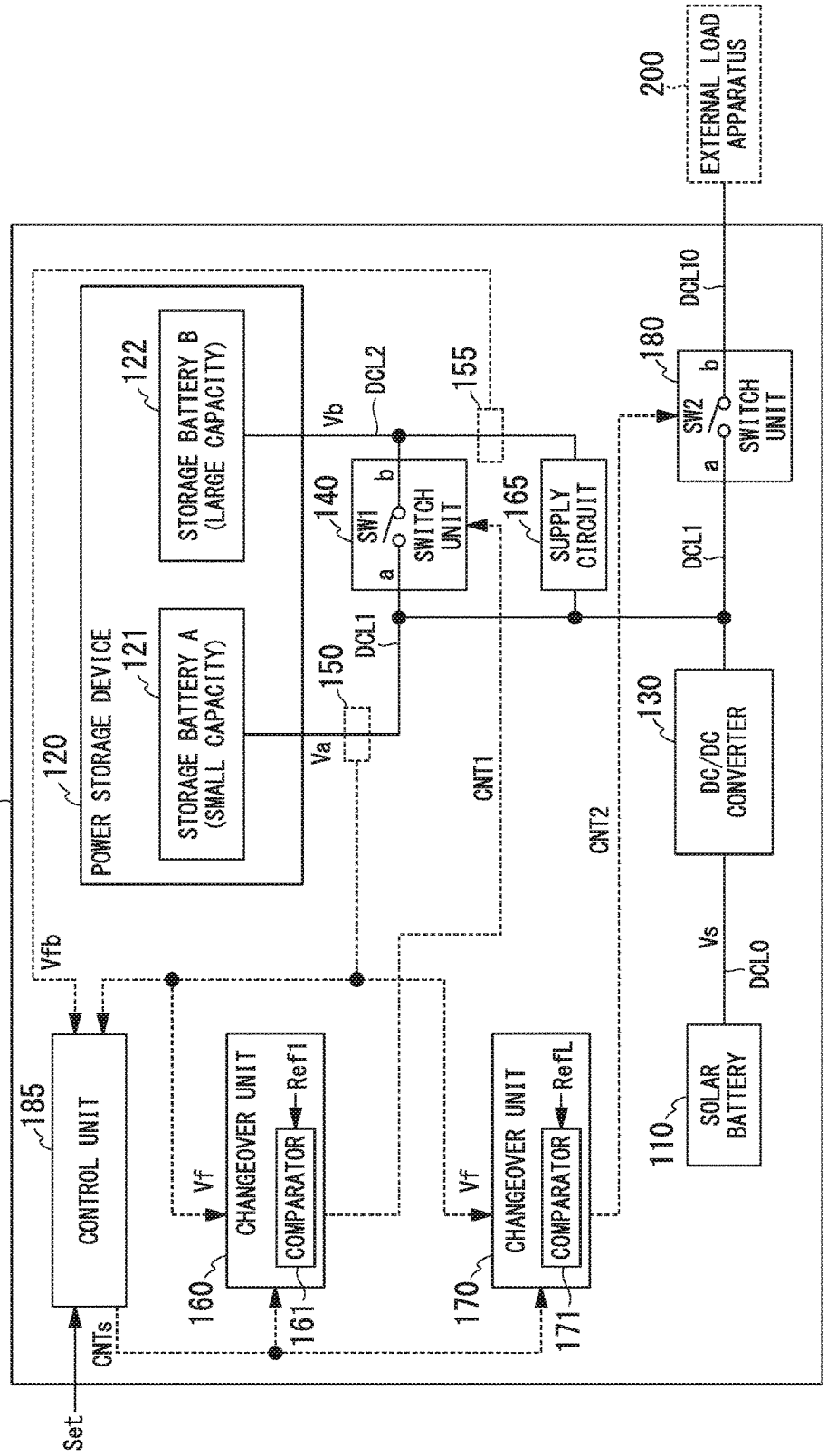
FIG. 9 is a configuration diagram showing a modification example of the power storage system 101.

FIG. 9 is a configuration diagram showing a modification example of the power storage system 101.

A power storage system 101A shown in FIG. 9 is different from the power storage system 101 shown in FIG. 3 in that a voltage detection unit 155, a changeover unit 170 (second changeover unit), a switch unit 180 (second switch unit), and a control unit 185 are provided. The reason why the changeover unit 170 and the control unit 185 are additionally provided will be described later, and, first, a configuration and an operation of the power storage system 101A will be described.

In FIG. 9, the voltage detection unit 150 outputs the detection signal Vf for the voltage Va of the storage battery A121 to the changeover unit 160, the changeover unit 170, and the control unit 185. The voltage detection unit 155 is constituted by using a resistance voltage-dividing circuit or the like, and outputs a detection signal Vfb for the voltage Vb of the storage battery B122 to the control unit 185.

One terminal a of the switch unit 180 is connected to the power supply line DCL1, and the other terminal b thereof is connected to the external load apparatus 200 via a power supply line DCL10.

The switch unit 180 turns on or off an internal switch SW2 according to instruction content of a control signal CNT2 which is input from the changeover unit 170, and thus performs switching between an electrical connection state and disconnection state between the power supply line DCL1 and the power supply line DCL10. In other words, if the switch SW2 is turned on, the power supply line DCL1 and the power supply line DCL10 are electrically connected to each other, and thus power is supplied from the power storage system 101A to the external load apparatus 200.

The changeover unit 170 includes a comparator 171. The comparator 171 compares a predetermined reference voltage RefL generated by a reference voltage generation circuit (not shown) with the detection signal Vf for the voltage Va of the storage battery A121 which is input from the voltage detection unit 150. The reference voltage RefL corresponds to the driving possible voltage VL (second threshold voltage) associated with the operation voltage Vout of the external load apparatus 200. The driving possible voltage VL is set as a voltage (VL=operation voltage Vout+ΔVo) which is higher than an operation voltage Vout causing the external load apparatus 200 to be actually operated, by a predetermined voltage ΔVo. The driving possible voltage VL is used to determine whether or not the voltage Va of the storage battery A121 exceeds the operation voltage Vout causing the external load apparatus 200 to be operated. In other words, the driving possible voltage VL is a voltage having a margin relative to the operation voltage Vout causing the external load apparatus 200 to be actually operated, and causes the external load apparatus 200 to be reliably activated when the switch SW2 is turned on.

The changeover unit 170 outputs the control signal CNT2 to the switch unit 180 in response to a comparison result in the comparator 171. The control signal CNT2 is used to control turning on and off of the switch SW2 of the switch unit 180. The switch unit 180 performs opening or closing of the switch SW2 on the basis of the instruction content of the control signal CNT2.

In other words, in a case where the voltage Va of the storage battery A121 exceeds the voltage VL, the changeover unit 170 turns on the switch SW2 of the switch unit 180. Consequently, the power supply line DCL1 is connected to the power supply line DCL10, and thus power of the power storage system 101A is supplied to the external load apparatus 200. In a case where the voltage Va of the storage battery A121 is equal to or less than the voltage VL, the changeover unit 170 turns off the switch SW2 of the switch unit 180. Consequently, the power supply line DCL1 is electrically disconnected from the power supply line DCL10, and thus power of the power storage system 101A is not supplied to the external load apparatus 200.

Figure 10:
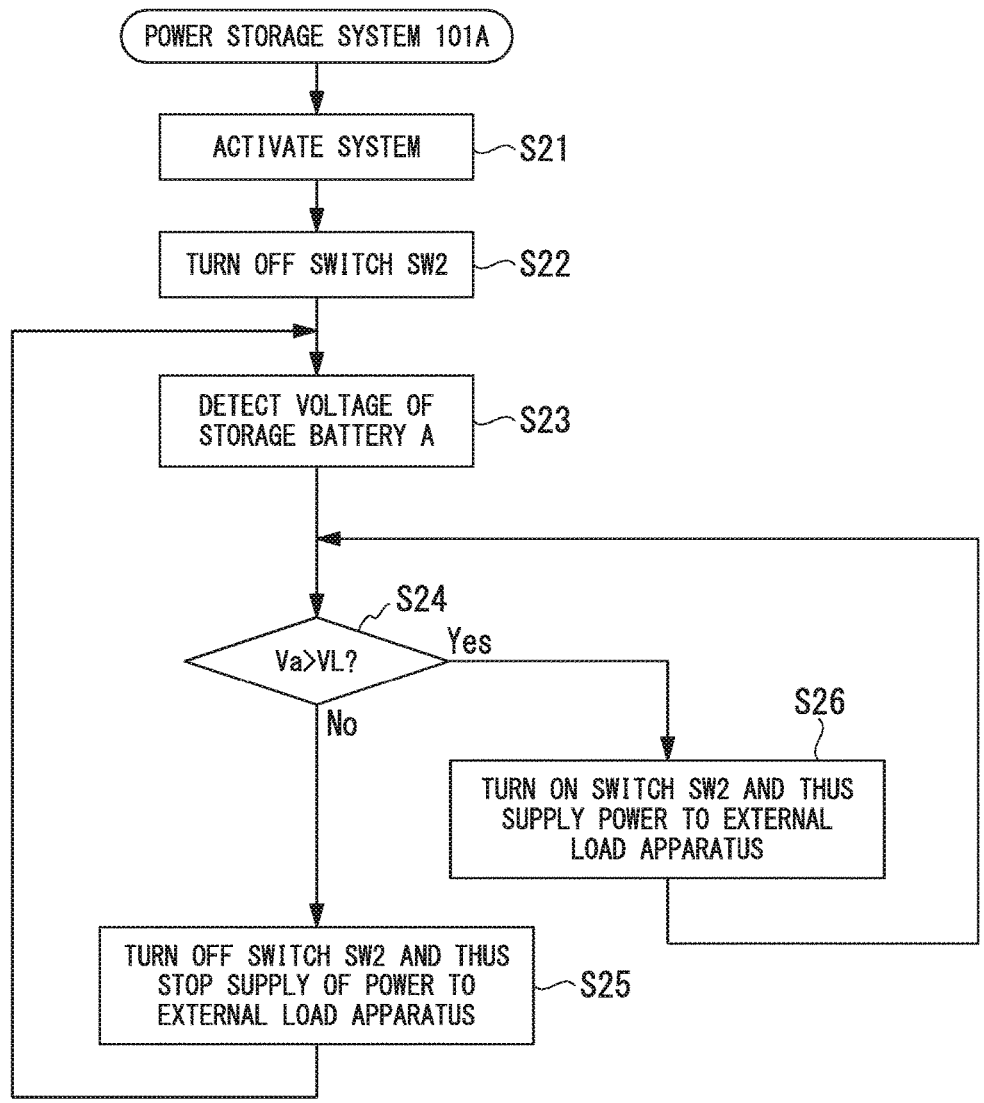
FIG. 10 is a flowchart showing a flow of processes in a changeover unit 170.

FIG. 10 is a flowchart showing a flow of processes in the changeover unit 170. A flow of processes in the changeover unit 160 is described in FIG. 7.

With reference to FIG. 10, first, it is assumed that the storage battery A121 and the storage battery B122 are not charged. If the power storage system 101A is activated (step S21), the changeover unit 170 turns off the switch SW2 of the switch unit 140 so that power stops being supplied to the external load apparatus 200 (step S22).

Successively, the comparator 171 of the changeover unit 170 detects the voltage Va of the storage battery A121 (step S23), and determines whether or not the voltage exceeds the driving possible voltage VL capable of driving the external load apparatus 200 (step S24).

In a case where it is determined that the voltage Va of the storage battery A121 does not exceed the driving possible voltage VL in step S24 (step S24: No), the changeover unit 170 turns off the switch SW2 (step S25), returns to the process in step S23 again, and detects the voltage Va of the storage battery A121.

On the other hand, in a case where it is determined that the voltage Va of the storage battery A121 exceeds the driving possible voltage VL in step S24 (step S24: Yes), the changeover unit 170 proceeds to a process in step S26, and turns on the switch SW2 so that power starts to be supplied to the external load apparatus 200 (step S26). After the process in step S26 is performed, the changeover unit 170 returns to step S23, and detects the voltage Va of the storage battery A121 again.

In a case where the voltage Va of the storage battery A121 exceeds the driving possible voltage VL, the changeover unit 170 turns on the switch SW2 on the basis of the flow of the processes so that power can be supplied to the external load apparatus 200. In a case where the voltage Va of the storage battery A121 is lower than the driving possible voltage VL, the changeover unit 170 turns off the switch SW2 so that power can stop being supplied to the external load apparatus 200.

In FIG. 9, the control unit 185 controls operations of the changeover unit 160 and the changeover unit 170. For example, the control unit 185 sends a control signal CNTs to the changeover unit 160 and the changeover unit 170 on the basis of an external setting signal Set which is externally input, so as to control operations of the changeover unit 160 and the changeover unit 170. For example, the control unit 185 may change the hysteresis characteristics of the changeover unit 160 by using the control signal CNTs. The control unit 185 may change setting of the driving possible voltage VL in the changeover unit 170 by using the control signal CNTs.

As mentioned above, the configuration and the operation of the power storage system 101A have been described. Above all, the reason why the switch unit 180 (switch SW2) or the control unit 185 is provided has been partially described, but, here, the reason why the switch unit 180 or the control unit 185 is provided will be described again.

Figure 11:
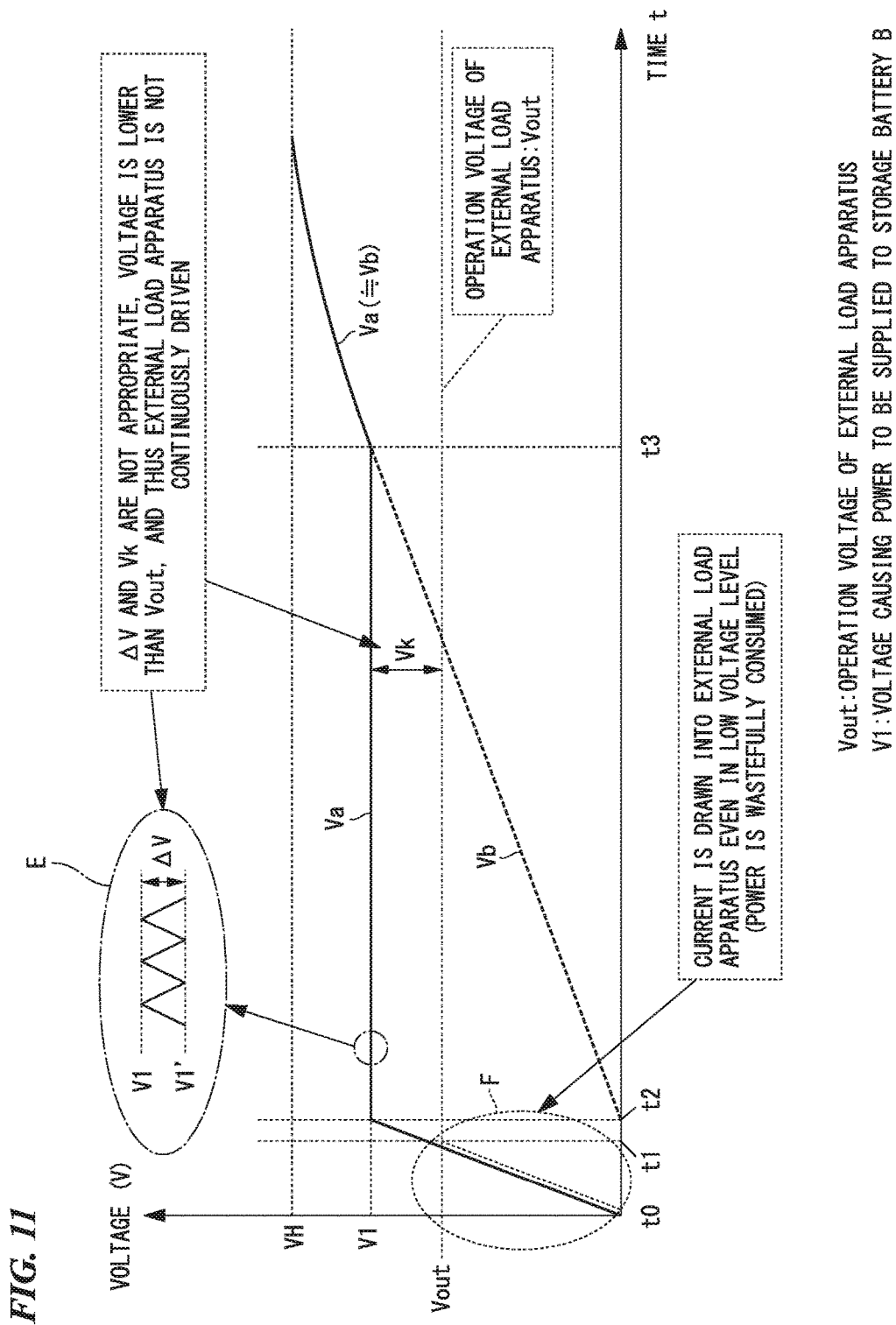
FIG. 11 is an explanatory diagram showing a problem when power is supplied to an external load apparatus 200.

FIG. 11 is an explanatory diagram showing a problem when power is supplied to the external load apparatus 200. In FIG. 11, a transverse axis expresses elapse of time t, and a longitudinal axis expresses a voltage (V). FIG. 11 shows an image of a temporal change in the voltage Va of the storage battery A121 and an image of a temporal change in the voltage Vb of the storage battery B122. The image of the temporal change in the voltage Va of the storage battery A121 and the image of the temporal change in the voltage Vb of the storage battery B122 are the same as those in FIG. 6 described above, and a repeated description will be omitted.

At a time point t0 in FIG. 11, if initial charging of the power storage device 120 is started from the solar battery 110 via the DC/DC converter 130, the changeover unit 160 turns off the switch SW1 of the switch unit 140 so that the supply of power to only the storage battery A121 is started. Successively, the voltage Va of the storage battery A121 gradually increases between the time point t0 and a time point t1, and reaches the operation voltage Vout causing the external load apparatus 200 to be operated at the time point t1. The voltage Va of the storage battery A121 increases to the voltage V1 (first threshold voltage) between the time point t1 and a time point t2. At the time point t2, the changeover unit 160 turns on the switch SW1 of the switch unit 140 so that power is supplied to the storage battery B122 due to electric charge accumulated in the storage battery A121.

In FIG. 11, as indicated by a portion F surrounded by a dashed line, if power is supplied to the external load apparatus 200 in a state in which the voltage Va of the storage battery A121 is low between from the time point t0 to the time point t1, a current flowing through the storage battery A121 from the DC/DC converter 130 is drawn into the external load apparatus 200. Thus, the external load apparatus 200 cannot be driven, and power is wastefully consumed. As a first problem, charging of the storage battery A121 is delayed due to the wasteful power consumption.

After the time point t2, the voltage Va of the storage battery A121 becomes a voltage which changes between the voltage V1 and the voltage V1' (third threshold voltage) due to an operation of turning on or off the switch SW1. In this case, if a voltage difference ΔV between the voltage V1 and the voltage V1' and a voltage difference Vk between the voltage V1' and the operation voltage Vout do not have appropriate values, the voltage V1' is lower than the operation voltage Vout of the external load apparatus 200. Therefore, as a second problem, the external load apparatus 200 cannot be continuously driven.

In order to cope with the first problem, the above-described switch SW2 is provided in the power storage system 101A. In other words, as indicated by a portion F surrounded by a dashed line in FIG. 12, the switch SW2 is turned off until the voltage Va of the storage battery A121 reaches the driving possible voltage VL (operation voltage Vout+ΔVo) of the external load apparatus 200. In a case where the voltage Va of the storage battery A121 reaches the driving possible voltage VL at the time point t1, the switch SW2 is turned on. In other words, since the switch SW2 is turned off from the time point t0 to the time point t1, power is not supplied to the external load apparatus 200, and since the switch SW2 is turned on at the time point t1, power is supplied to the external load apparatus 200 after the time point t1.

Consequently, in the power storage system 101A, in a case where a voltage of the storage battery A121 is low, such as a case where the power storage device 120 is initially charged, wasteful power consumption is prevented by stopping the supply of power to the external load apparatus 200, and thus it is possible to quicken charging of the storage battery A121.

Figure 12:
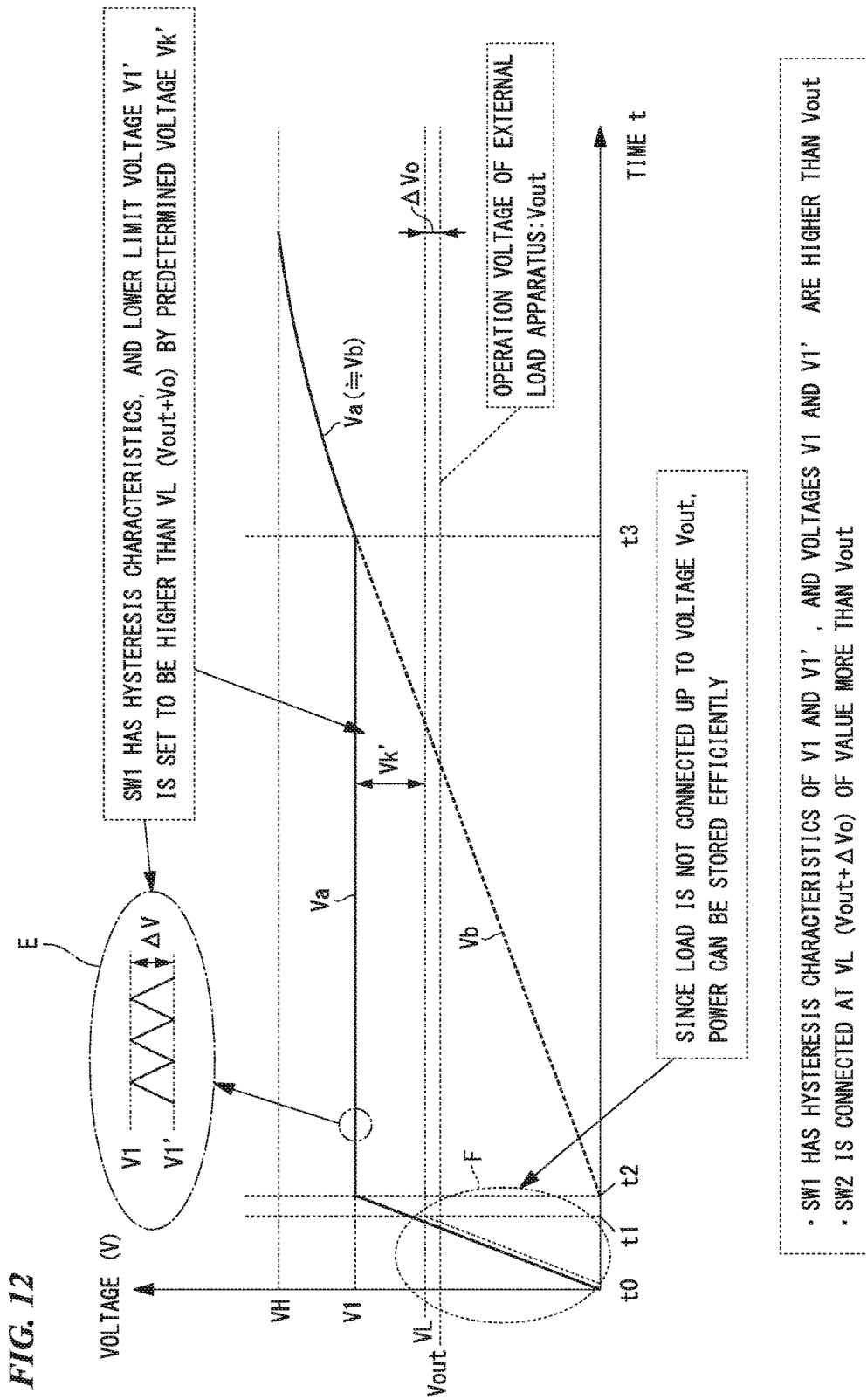
FIG. 12 is an explanatory diagram showing a method of coping with the problem when power is supplied to the external load apparatus 200.

Regarding the second problem, as indicated by a portion E surrounded by a dashed line in FIG. 12, a determination voltage used to bring the switch SW1 into a turned-on state or a turned-off state has hysteresis characteristics of the voltage ΔV (=V1−V1'). Thus, an appropriate marginal voltage Vk' is formed between the voltage V1' and the driving possible voltage VL (=operation voltage Vout+ΔVo). In other words, since the switch SW1 has the hysteresis characteristics, the changeover unit 160 sets the lower limit voltage V1' of the voltage change in the storage battery A121 to a voltage which is higher than the driving possible voltage VL by the marginal voltage Vk'.

As mentioned above, in the power storage system 101A, the appropriate marginal voltage Vk' is set between the voltage V1' and the driving possible voltage VL according to the hysteresis characteristics of the switch SW1, and thus it is possible to prevent the switch SW2 from discontinuously repeating a turned-on state and a turned-off state.

The power storage system 101A may supply power to the external load apparatus 200 only in a case where a voltage corresponding to an input power specification (input voltage range) of the external load apparatus 200 can be supplied.

Figure 13:
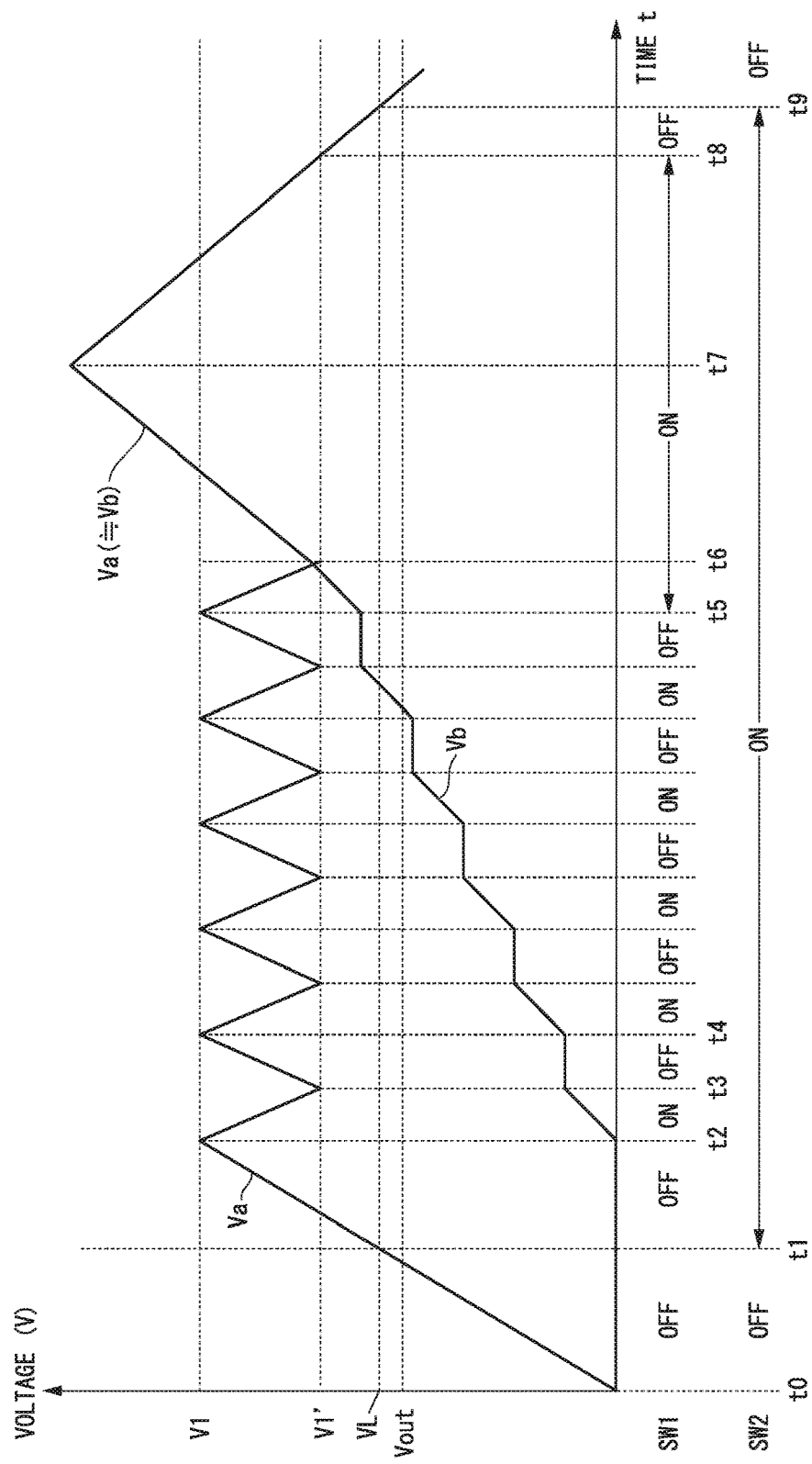
FIG. 13 is an explanatory diagram showing timings at which a switch SW1 and a switch SW2 are turned on and off.

FIG. 13 is an explanatory diagram showing timings at which the switch SW1 and the switch SW2 are turned on and off. In FIG. 13, a transverse axis expresses elapse of time t, and a longitudinal axis expresses a voltage (V). FIG. 13 shows an image of a temporal change in the voltage Va of the storage battery A121 and an image of a temporal change in the voltage Vb of the storage battery B122. FIG. 13 shows a period in which the solar battery 110 generates power, for example, in the daytime from a time point t0 to a time point t7, and a period in which the solar battery 110 stops generation of power, for example, at night after the time point t7.

With reference to FIG. 13, at the time point t0, if initial charging of the power storage device 120 is started from the solar battery 110 via the DC/DC converter 130, the changeover unit 160 turns off the switch SW1 of the switch unit 140 so that the supply of power to only the storage battery A121 is started when charging is started at the time point t0. The switch SW2 is turned off since the voltage Va of the storage battery A121 does not reach the voltage VL (=Vout+ΔVo).

Successively, the voltage Va of the storage battery A121 gradually increases and reaches the operation voltage Vout causing the external load apparatus 200 to be driven between the time point t0 and the time point t1. If the voltage Va of the storage battery A121 increases to the voltage VL (=Vout+ΔVo) at the time point t1, the changeover unit 170 turns on the switch SW2 of the switch unit 180 so that power starts to be supplied to the external load apparatus 200 due to electric charge accumulated in the storage battery A121. The switch SW2 is maintained to be turned on between the time point t1 and a time point t8 which will be described later.

If the voltage of the storage battery A121 increases to the voltage V1 at the time point t2, the changeover unit 160 turns on the switch SW1 of the switch unit 140 so that power is supplied to the storage battery B122 due to electric charge accumulated in the storage battery A121.

If a current flows through the storage battery B122 from the storage battery A121, the voltage Va of the storage battery A121 starts to be reduced. In a case where the voltage of the storage battery A121 is reduced to the voltage V1' at the time point t3, the changeover unit 160 turns off the switch SW1 so that the storage battery B122 is electrically disconnected from the storage battery A121. In other words, the switch SW1 is turned on between the time point t2 and the time point t3.

Next, if the switch SW1 is turned off at the time point t3, the voltage Va of the storage battery A121 starts to increase again due to a charging current from the DC/DC converter 130. If the voltage of the storage battery A121 increases to the voltage V1 again at the time point t4, the changeover unit 160 turns on the switch SW1 so that power is supplied to the storage battery B122 due to electric charge accumulated in the storage battery A121. In other words, the switch SW1 is turned off between the time point t3 and the time point t4.

Next, the switch SW1 repeats a turned-on state and a turned-off state after the time point t4, and the switch SW1 is turned on at the time point t5. Therefore, the voltage Va of the storage battery A121 is reduced between the time point t5 and the time point t6, but the voltage Vb of the storage battery B122 sufficiently increases at the time point t6, and thus the switch SW1 is not turned off and is maintained to be turned on at the time point t6.

The switch SW1 is in a turned-on state from the time point t6 to the time point t8 which will be described later, and thus the voltage Va of the storage battery A121 is nearly the same as the voltage Vb of the storage battery B122. The storage battery A121 and the storage battery B122 are continuously charged from the DC/DC converter 130 between the time point t6 and the time point t7, and thus the voltages of the storage battery A121 and the storage battery B122 increase.

At the time point t7, the solar battery 110 stops generation of power, for example, at night, and thus the storage battery A121 and the storage battery B122 stop being charged from the DC/DC converter 130.

Thus, after the time point t7, since power is supplied to the external load apparatus 200 without being supplied with power from the solar battery 110, the voltages Va and Vb of the storage battery A121 and the storage battery B122 are gradually reduced. If the voltages Va and Vb of the storage battery A121 and the storage battery B122 are reduced to the voltage V1' between the time point t7 and the time point t8, the switch SW1 is turned off again, but charging of the storage battery A121 from the DC/DC converter 130 is not performed. Therefore, the voltages Va and Vb of the storage battery A121 and the storage battery B122 continue to be reduced without increasing.

At the time point t8, the storage battery B122 can supply power to the external load apparatus 200 via the supply circuit 165 even in a state in which the switch SW1 is turned off.

Next, if the voltage Vb of the storage battery B122 is equal to or lower than the driving possible voltage VL (=Vout+ΔVo) between the time point t8 and a time point t9, the switch SW2 is turned off, and thus power stops being supplied to the external load apparatus 200 from the power storage system 101A.

As mentioned above, if the hysteresis width (V1−V1') in the changeover unit 160 and the driving possible voltage VL for determining an turned-on state and a turned-off state of the switch SW2 are appropriately set, the switch SW2 can be continuously maintained in a turned-on state. Consequently, the external load apparatus 200 can be stably driven.

In the power storage system 101A, the control unit 185 is provided, and thus it is possible to set, for example, any hysteresis width (V1−V1') in the changeover unit 160 and any driving possible voltage VL used to control a turned-on state or a turned-off state of the switch SW2 by using the external setting signal Set. Consequently, it is possible to appropriately set the hysteresis width (V1−V1') and the driving possible voltage VL according to a value of the operation voltage Vout of the external load apparatus 200 connected to the power storage system 101A.

The control unit 185 may control a turned-on state or a turned-off state of the switch SW1 of the switch unit 140 via the changeover unit 160 on the basis of the input detection signal Vf for the voltage Va of the storage battery A121 and the input detection signal Vfb for the voltage Vb of the storage battery B122. Alternatively, the control unit 185 may monitor the detection signal Vf for the storage battery A121 and the detection signal Vfb for the storage battery B122, and thus the control unit 185 may directly control turned-on states or turned-off states of the switch SW1 and the switch SW2. The control unit 185 may not be provided inside the power storage system 101A but may be provided, for example, on the external load apparatus 200 side.

The switch unit 180 may be constituted by using a DC/DC converter. In a case where the DC/DC converter is used, power can be supplied to the external load apparatus 200 by using a boosting function of the DC/DC converter even in a case where a voltage of the storage battery B122 is lower than the driving possible voltage VL.

A description has been provided of an example in which only the changeover unit 160 has the hysteresis characteristics in the power storage system 101A, but the changeover unit 170 may also have the hysteresis characteristics. In other words, the changeover unit 170 may also have the hysteresis characteristics when it is determined whether or not a voltage of the storage battery A121 exceeds the driving possible voltage VL.

In the power storage system 101 and the power storage system 101A, a description has been provided of an example in which two storage batteries such as the storage battery A121 and the storage battery B122 are used. However, a third storage battery C (not shown) having a capacity larger than that of the storage battery B122 may be provided. In this case, power is also supplied to the storage battery C in a case where the voltage Va of the storage battery A121 and the voltage Vb of the storage battery B122 are equal to or higher than a predetermined voltage. Consequently, the storage battery C may be used as a storage battery for use in emergency or a storage battery corresponding to a long period of time such as a monthly basis.

As described above, the power storage system 101 is provided with a plurality of storage batteries including the storage battery A121 (first storage battery) and the storage battery B122 (second storage battery), the switch unit 140, and the changeover unit 160. The storage battery A121 is configured to be supplied with power generated by a power generation element (for example, the solar battery 110) performing environmental power generation, and to supply power to the external load apparatus 200. The storage battery B122 is configured to have a capacity larger than that of the storage battery A121 and to supply power to the external load apparatus 200. The switch unit 140 performs switching between an electrical connection state and disconnection state between the storage battery A121 and the storage battery B122. The changeover unit 160 compares the voltage Va of the storage battery A121 with the voltage V1 (a predetermined first threshold voltage) which is equal to or higher than a voltage causing the external load apparatus to be operated, and controls the switch unit 140 on the basis of a comparison result. In a case where the voltage Va of the storage battery A121 is equal to or lower than the voltage V1, the changeover unit 160 controls the switch unit 140 so that the storage battery A121 and the storage battery B122 are disconnected from each other, and thus power generated by the power generation element (solar battery 110) is supplied to only the storage battery A121. In a case where the voltage of the storage battery A121 exceeds the voltage V1, the changeover unit 160 controls the switch unit 140 so that the storage battery A121 and the storage battery B122 are connected to each other, and thus power is supplied to the storage battery B122 from the storage battery A121.

As mentioned above, the power storage system 101 uses two types of storage battery A121 and the storage battery B122 having different capacities, and the switch unit 140. Power is preferentially supplied to the first storage battery A121 up to the voltage VL (more accurately, the voltage V1 causing power to be supplied to the storage battery B122) causing the external load apparatus 200 to be operated. In a case where the voltage Va of the storage battery A121 exceeds the voltage V1, power is supplied from the storage battery A121 to the storage battery B122.

Consequently, it is possible to rapidly increase the output voltage from the power storage system 101 even in a case where the storage battery having a large capacity is used. Thus, the power storage system 101 can rapidly activate the external load apparatus 200.

Figure 14:
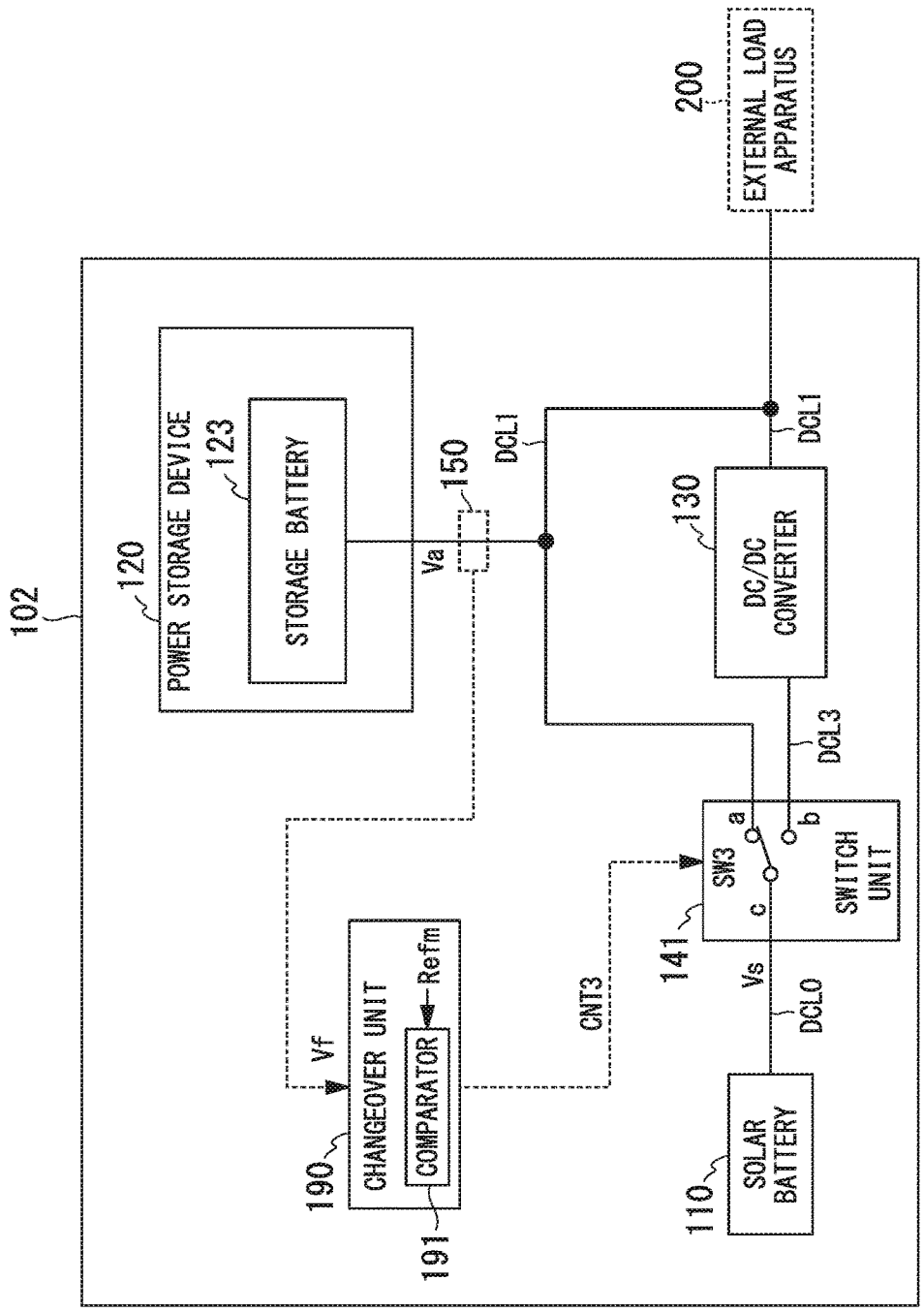
FIG. 14 is a configuration diagram showing a configuration example of a power storage system 102.

FIG. 14 is a configuration diagram showing a configuration example of a power storage system 102.

When compared with the power storage system 101 shown in FIG. 3, the power storage system 102 shown in FIG. 14 is different therefrom as follows. First, the power storage system 102 includes a switch unit 141 instead of the switch unit 140 shown in FIG. 3. The power storage device 120 is constituted of a single storage battery 123. A comparator 191 of a changeover unit 190 compares the detection signal Vf for the voltage Va of the storage battery A121 with a predetermined reference voltage Refm output from a reference voltage generation circuit (not shown). The switch unit 141 has a contact point c which is connected to the solar battery 110 via the power supply line DCL0, a contact point a which is connected to the power supply line DCL1, and a contact point b which is connected to the DC/DC converter 130 via a power supply line DCL3.

Remaining configurations are the same as those of the power storage system 101 shown in FIG. 3. Thus, the same constituent element is given the same reference numeral, and a repeated description will be omitted.

Meanwhile, in a case where charging is performed in a low voltage state in which a voltage of the storage battery 123 is close to 0 V (zero volts), a general DC/DC converter steps up a voltage with considerably low efficiency, and a conversion loss during stepping-up increases. This state is called a start-up mode or a cold start mode, and causes a great problem in a case where low power is stored as in energy harvesting. In other words, the DC/DC converter 130 can perform a highly efficient boosting operation called main boost for the first time after power is stored in the storage battery 123 up to a predetermined voltage. The conversion efficiency of the DC/DC converter 130 is about 10% to 40% in the start-up mode or the cold start mode in which the conversion efficiency is low, and is about 70% to 90% in the main boost mode in which the conversion efficiency is high.

In the following description, a voltage Va of the storage battery 123 causing the conversion efficiency of the DC/DC converter 130 to be equal to or more than a predetermined value will be referred to as a main boost voltage Vm. As the main boost voltage Vm, that is, a voltage bringing the DC/DC converter 130 into the main boost mode, a voltage of the storage battery 123 causing the conversion efficiency of the DC/DC converter 130 to be 70% or more is preferably used.

Therefore, in the power storage system 102, the comparator 191 of the changeover unit 190 compares the detection signal Vf for the voltage Va of the storage battery 123 with the predetermined reference voltage Refm, so as to determine whether or not the voltage Va of the storage battery 123 exceeds a predetermined voltage Vc which is equal to or higher than the main boost voltage Vm. The reference voltage Refm corresponds to a voltage Vm (fourth threshold voltage) of the storage battery 123, and is used to determine whether or not the voltage Va of the storage battery 123 exceeds the voltage Vm causing main boost. As examples of the voltage Vm causing main boost and the predetermined voltage Vc in the present embodiment, the voltage Vm causing main boost is 1.8 V, and the predetermined voltage Vc (first threshold voltage) is 2.0 V.

In a case where the voltage Va of the storage battery 123 is equal to or lower than the predetermined voltage Vc, the changeover unit 190 electrically connects the contact point a of the switch SW3 to the contact point c thereof so that power is directly supplied from the solar battery 110 to the storage battery 123. In a case where the voltage of the storage battery 123 exceeds the predetermined voltage Vc, the changeover unit 190 electrically connects the contact point b of the switch SW3 to the contact point c thereof so that power is supplied to the storage battery 123 via the DC/DC converter 130. The predetermined voltage Vc (first threshold value) may be set so that power is supplied to the DC/DC converter 130 after the DC/DC converter 130 is brought into the main boost mode, and the predetermined voltage (first threshold value) Vc may be the same as the voltage Vm bringing the DC/DC converter 130 into the main boost mode.

Figure 15:
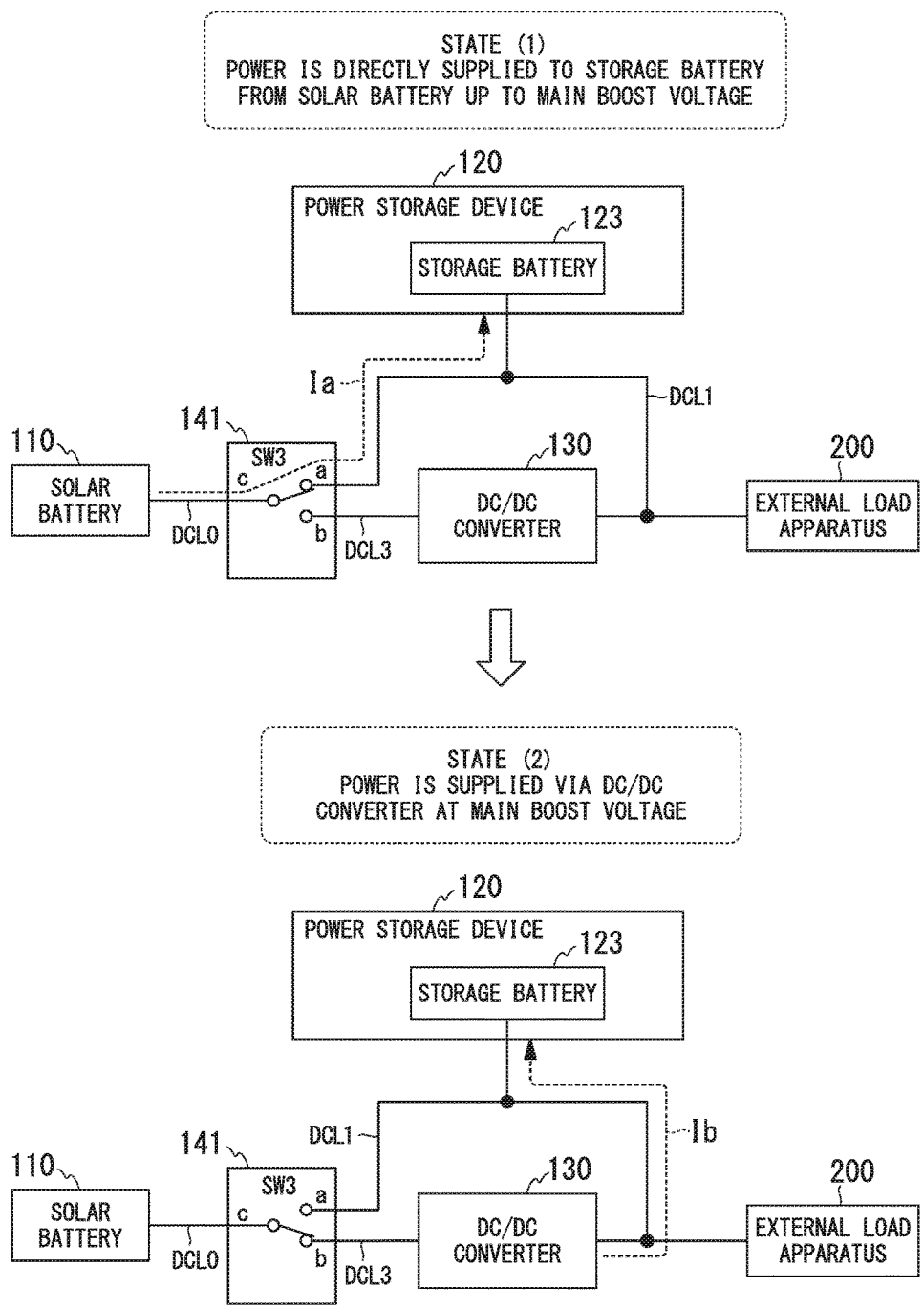
FIG. 15 is an explanatory diagram showing an aspect of a charging operation of a storage battery 123.

FIG. 15 is an explanatory diagram showing an operation of a charging operation of the storage battery 123.

As shown in a state (1) in FIG. 15, the changeover unit 190 electrically connects the contact point a of the switch SW3 of the switch unit 141 to the contact point c thereof until the voltage Va of the storage battery 123 becomes the predetermined voltage Vc. A current Ia is made to flow through the storage battery 123 from the solar battery 110 so that power is directly supplied thereto. Thereafter, if the voltage Va of the storage battery 123 becomes the predetermined voltage Vc, the changeover unit 190 electrically connects the contact point b of the switch SW3 of the switch unit 141 to the contact point c thereof so that power is supplied from the solar battery 110 to the DC/DC converter 130. A current Ib is made to flow through the storage battery 123 from the DC/DC converter 130 so that power is supplied thereto.

Figure 16:
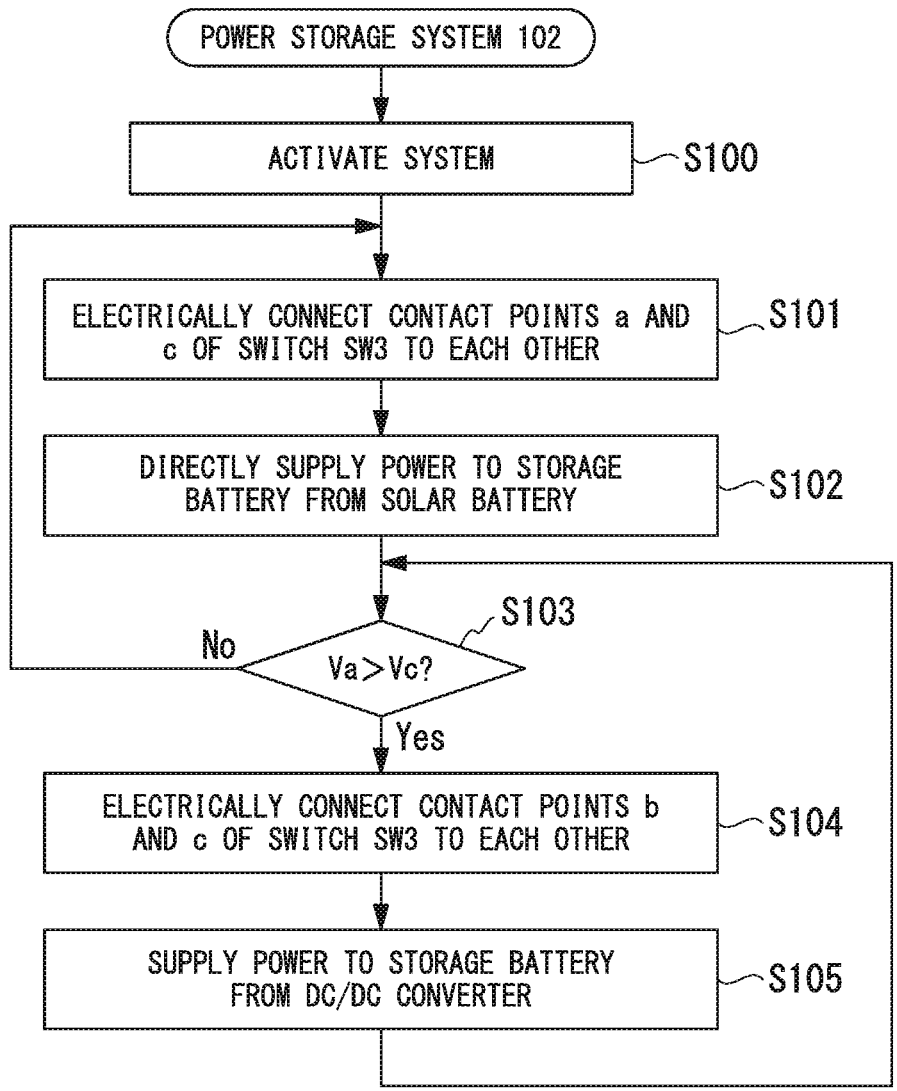
FIG. 16 is a flowchart showing a flow of processes in the power storage system 102.

FIG. 16 is a flowchart showing a flow of processes in the power storage system 102, and is a flowchart showing a flow of the above-described operations in the power storage system 102. Hereinafter, with reference to FIG. 16, the flow of the processes will be described.

First, it is assumed that the storage battery 123 is not charged. If the power storage system 102 is activated (step S100), the changeover unit 190 initially sends a control signal CNT3 to the switch unit 140 so that the contact point a of the switch SW3 of the switch unit 141 is electrically connected to the contact point c thereof, and the contact point b is electrically disconnected from the contact point c (step S101). Consequently, the changeover unit 190 causes power to be directly supplied from the solar battery 110 to the storage battery 123 (step S102).

Successively, power is supplied to the storage battery 123, and thus the voltage Va (which is the same as a voltage of the power supply line DCL1) of the storage battery 123 increases. Next, the comparator 191 of the changeover unit 190 determines whether or not the voltage Va of the storage battery 123 exceeds the predetermined voltage Vc (step S103).

In a case where it is determined that the voltage Va of the storage battery 123 does not exceed the predetermined voltage Vc in step S103 (step S103: No), the flow returns to the process in step S101. In this case, the changeover unit 190 electrically connects the contact point a of the switch SW3 of the switch unit 141 to the contact point c thereof, and electrically disconnects the contact point b from the contact point c, so that power continues to be directly supplied from the solar battery 110 to the storage battery 123.

Next, in a case where charging of the storage battery 123 is performed, the voltage Va of the storage battery 123 increases, and it is determined that the voltage Va of the storage battery 123 exceeds the voltage Vc (step S103: Yes), the flow proceeds to a process in step S104. In this case, the changeover unit 190 electrically disconnects the contact point a of the switch SW3 of the switch unit 141 from the contact point c thereof, and electrically connects the contact point b to the contact point c (step S104). Consequently, the changeover unit 190 causes power to be supplied from the DC/DC converter 130 to the storage battery 123 (step S105).

Next, the changeover unit 190 returns to the process in step S103, and starts the processes from step S103 again.

In the power storage system 102, power is directly supplied from the solar battery 110 to the storage battery 123 until the voltage Va of the storage battery 123 becomes the predetermined voltage Vc on the basis of the flow of the processes. If the voltage Va of the storage battery 123 exceeds the predetermined voltage Vc, power can be supplied to the storage battery 123 from the solar battery 110 via the DC/DC converter 130. In other words, in the power storage system 101A, when power is supplied to the storage battery 123 which is in a state in which a charging voltage is low, power can be supplied without being influenced by a conversion loss during stepping-up of a voltage in the DC/DC converter. It is possible to shorten time for storing power in the storage battery 123 in a state in which the voltage Va to which the storage battery 123 is charged is low.

In the power storage system 102, it is determined whether or not power is to be supplied to the storage battery 123 via the DC/DC converter 130 on the basis of only the voltage Va of the storage battery 123.

Particularly, in an environment of predetermined illuminance or lower, a low illuminance dye-sensitized solar battery for low illuminance is used as the storage battery 123, and thus generated power is low. In this case, the DC/DC converter 130 which is electrically connected to the storage battery 123 is in a mode in which the conversion efficiency is low until the voltage Va of the storage battery 123 is equal to or higher than the first threshold voltage Vm. If the voltage of the storage battery 123 is equal to or higher than the first threshold voltage, the DC/DC converter 130 is brought into the main boost mode in which the conversion efficiency is high.

Therefore, the power storage system 102 is considerably effective in the environment of predetermined illuminance or lower.

As described above, the power storage system 102 is provided with the storage battery 123, the DC/DC converter 130, the switch unit 141, and the changeover unit 190. The storage battery 123 is supplied with power generated by a power generation element (for example, the solar battery 110) performing environmental power generation. The DC/DC converter 130 steps up an output voltage from the power generation element (solar battery 110) to a predetermined voltage. The switch unit 141 performs switching between whether an output voltage from the power generation element (solar battery 110) is directly supplied to the storage battery 123 or is supplied thereto via the DC/DC converter 130. The changeover unit 190 compares the voltage of the storage battery 123 with the predetermined voltage Vc (fourth threshold voltage) which is equal to or higher than the main boost voltage Vm, and controls the switch unit 141 according to a comparison result. In a case where the voltage of the storage battery 123 is equal to or lower than the predetermined voltage Vc, the changeover unit 190 controls the switch unit 141 so that power is directly supplied from the power generation element (solar battery 110) to the storage battery 123. In a case where the voltage of the storage battery 123 exceeds the predetermined voltage Vc, the changeover unit 190 controls the switch unit 141 so that power is supplied from the power generation element (solar battery 110) to the storage battery 123 via the DC/DC converter 130.

In the power storage system 102 with this configuration, the switch unit 141 switches between whether an output voltage from the solar battery 110 which is a power generation element is directly supplied to the storage battery 123 or is supplied thereto via the DC/DC converter 130. The changeover unit 190 determines whether or not the voltage Va of the storage battery 123 exceeds the predetermined voltage Vc, and controls the switch unit 141 so that power is directly supplied to the storage battery 123 from the solar battery 110 in a case where the voltage Va of the storage battery 123 is equal to or lower than the predetermined voltage Vc. In a case where the voltage Va of the storage battery 123 exceeds the predetermined voltage Vc, the changeover unit 190 controls the switch unit 141 so that power is supplied to the storage battery 123 from the solar battery 110 via the DC/DC converter 130.

Consequently, in the power storage system 102, power can be directly supplied to the storage battery 123 from the solar battery 110 without being influenced by a conversion loss during boosting in the DC/DC converter 130 in a state in which the voltage Va of the storage battery 123 is low. As mentioned above, in the power storage system 102, it is possible to shorten time for storing power in the storage battery 123 in a state in which the voltage Va of the storage battery 123 is low. Therefore, it is possible to rapidly increase the voltage of the storage battery 123.

Figure 17:
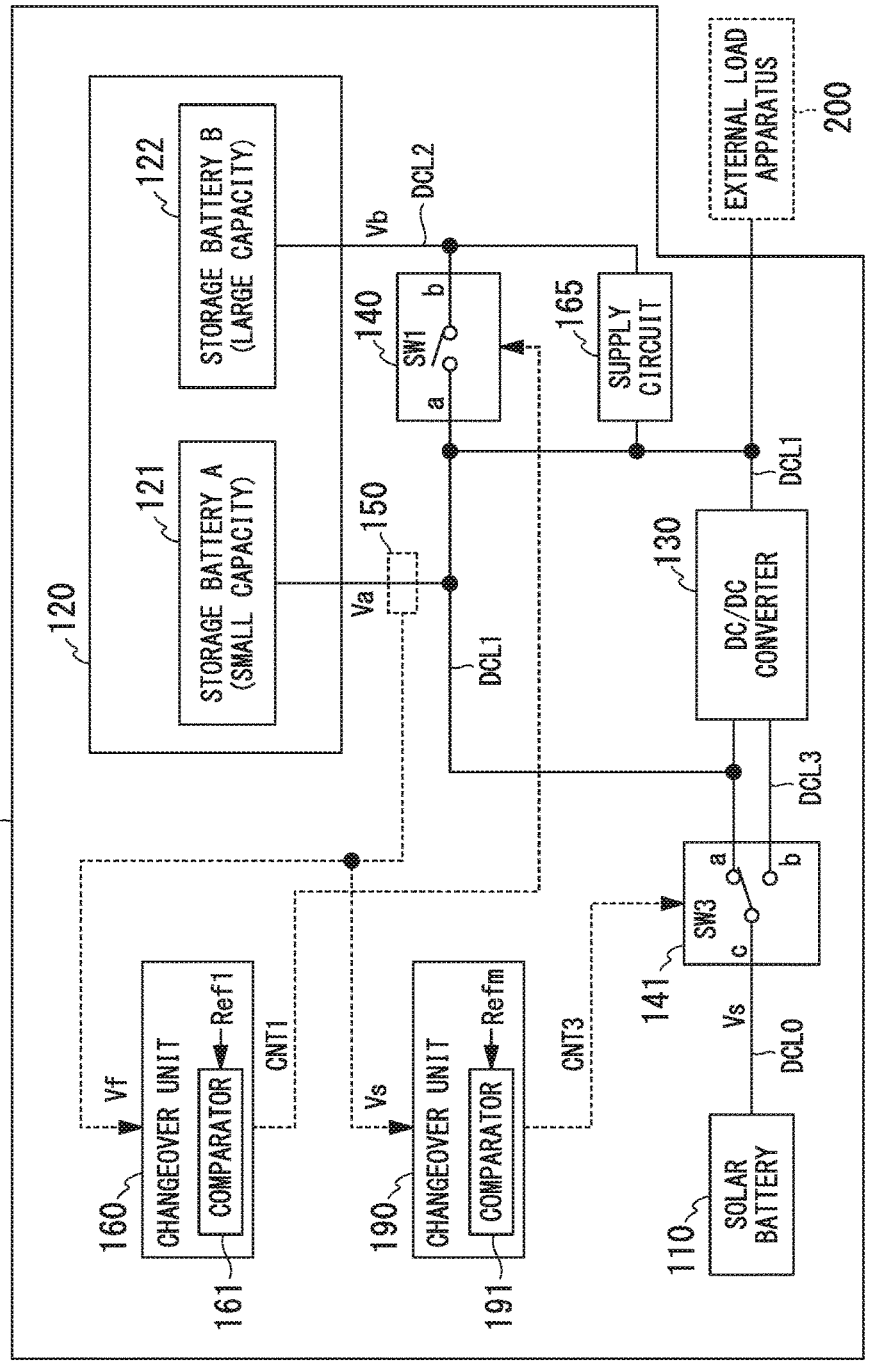
FIG. 17 is a configuration diagram showing a configuration example of a power storage system 103.

FIG. 17 is a configuration diagram showing a configuration example of a power storage system 103.

When compared with the power storage system 101 shown in FIG. 3, the power storage system 103 shown in FIG. 17 is only different therefrom in that a switch unit 141 and the a changeover unit 190 are additionally provided. Remaining configurations are the same as those of the power storage system 101 shown in FIG. 3. Thus, the same constituent element is given the same reference numeral, and repeated description will be omitted.

In the power storage system 103 shown in FIG. 17, in a case where the storage battery A121 is not charged, or the voltage Va of the storage battery A121 is low, the changeover unit 160 turns off the switch SW1 of the switch unit 140 so that power is supplied to only the storage battery A121 in the same manner as in the power storage system 101.

Simultaneously, in the same manner as in the power storage system 102, the changeover unit 190 electrically connects the contact point a of the switch SW3 of the switch unit 141 to the contact point c thereof, and electrically disconnects the contact point b from the contact point c. In other words, in the power storage system 103, in a case where the storage battery A121 is not charged, or the voltage Va of the storage battery A121 is low, power is directly supplied to the storage battery A121 from the solar battery 110 which is a power generation element without using the DC/DC converter 130.

After power starts to be supplied to the storage battery A121, in a case where the voltage Va of the storage battery A121 gradually increases, and the voltage Va reaches the predetermined voltage Vc, the changeover unit 190 electrically connects the contact point b of the switch SW3 of the switch unit 141 to the contact point c thereof (and electrically disconnects the contact point a from the contact point c), so that power is supplied to the storage battery A121 via the DC/DC converter 130.

Thereafter, in the same manner as in the power storage system 101, in a case where the voltage of the storage battery A121 reaches the driving possible voltage VL (=operation voltage Vout+ΔVo) causing the external load apparatus 200 to be driven, power starts to be supplied to the external load apparatus 200, and in a case where the voltage of the storage battery A121 reaches the voltage V1 (V1>VL>Vc), power starts to be supplied to the storage battery B122 from the storage battery A121.

In this case, the voltage V1 is preferably set so that a voltage obtained when the voltage of the first storage battery A121 and the voltage B122 of the second storage battery become constant due to the supply of power to the storage battery B122 from the storage battery A121 is equal to or higher than the predetermined voltage Vc of the main boost voltage Vm or higher.

If a voltage is equal to or higher than the predetermined voltage Vc even after power is supplied to the second storage battery having a large capacity from the first storage battery A121 having a small capacity, the DC/DC converter 130 is not brought into the cold start mode even after power is supplied to the second storage battery from the first storage battery A121. Therefore, the main boost mode can be maintained, and thus power can be stored more efficiently.

As mentioned above, in the power storage system 103, during starting of charging, first, power is preferentially supplied to only the storage battery A121 having a small capacity. When the voltage Va of the storage battery A121 is lower than the predetermined voltage Vc, power is directly supplied to the storage battery A121 from the solar battery 110 which is a power generation element without using the DC/DC converter 130. Consequently, in the power storage system 103, power can be selectively supplied to the storage battery A121 having a small capacity, and power can be supplied to the storage battery A121 without being influenced by a conversion loss during boosting in the DC/DC converter. Thus, it is possible to rapidly increase the voltage Va of the storage battery A121.

The power storage system 103 may be additionally provided with the changeover unit 170 and the switch unit 180 as shown in FIG. 9 (power storage system 101A).

A description has been provided of an example in which the solar battery 110 is used as a power generation element in the above-described power storage system (100, 101, 101A, 102, 103), but, power generation means, vibration, heat, wind power, electric waves, and the like may be used.

As mentioned above, the present invention has been described, but the power storage system of the present invention is not limited to the above-described shown examples, and may be variously modified within the scope without departing from the spirit of the present invention.

For example, the changeover unit 170 (second changeover unit), the switch unit 180 (second switch unit), or the control unit 185 as in the power storage system 101A shown in FIG. 9 may be additionally provided in the power storage system 103 shown in FIG. 17. Consequently, it is possible to achieve the effects of the power storage system 101A shown in FIG. 9 in addition to the effects of the power storage system 103 shown in FIG. 17.

DESCRIPTION OF THE REFERENCE SYMBOLS 100, 101, 101A, 102, AND 103 POWER STORAGE SYSTEM
110 SOLAR BATTERY
111, 112, 113, AND 114 SOLAR BATTERY CELL
120 POWER STORAGE DEVICE
121 STORAGE BATTERY A (FIRST STORAGE BATTERY)
122 STORAGE BATTERY B (SECOND STORAGE BATTERY)
130 DC/DC CONVERTER
140 SWITCH UNIT (FIRST SWITCH UNIT)
141 SWITCH UNIT
180 SWITCH UNIT (SECOND SWITCH UNIT)
150 AND 155 VOLTAGE DETECTION UNIT
160 CHANGEOVER UNIT (FIRST CHANGEOVER UNIT)

170 CHANGEOVER UNIT (SECOND CHANGEOVER UNIT)
190 CHANGEOVER UNIT
161, 171, AND 191 COMPARATOR
165 SUPPLY CIRCUIT
200 EXTERNAL LOAD APPARATUS
210 ENVIRONMENT MONITORING APPARATUS

The invention claimed is:

1. A power storage system comprising:
a first storage battery that is configured to be supplied with power generated by a power generation element performing environmental power generation and to supply power to an external load apparatus;
a second storage battery that is configured to have a capacity larger than a capacity of the first storage battery, and to supply power to the external load apparatus;
a first switch unit that performs switching between an electrical connection state and disconnection state between the first storage battery and the second storage battery; and
a first changeover unit that compares a voltage of the first storage battery with a first threshold voltage which is equal to or higher than a voltage causing the external load apparatus to be operated, and controls the first switch unit according to a comparison result, wherein
in a case where the voltage of the first storage battery is equal to or lower than the first threshold voltage, the first changeover unit controls the first switch unit so that the first storage battery is disconnected from the second storage battery, and thus power generated by the power generation element is supplied to only the first storage battery, and
in a case where the voltage of the first storage battery exceeds the first threshold voltage, the first changeover unit controls the first switch unit so that the first storage battery is connected to the second storage battery, and thus power is supplied to the second storage battery.

2. The power storage system according to claim 1, further comprising:
a second switch unit that performs switching between an electrical connection state and disconnection state between the first storage battery and the second storage battery, and the external load apparatus; and
a second changeover unit that compares the voltage of the first storage battery with a second threshold voltage, and controls the second switch unit according to a comparison result, wherein
in a case where the voltage of the first storage battery is higher than the second threshold voltage, the second changeover unit controls the second switch unit so that the first storage battery and the second storage battery are connected to the external load apparatus, and
in a case where the voltage of the first storage battery is lower than the second threshold voltage, the second changeover unit controls the second switch unit so that the first storage battery and the second storage battery are disconnected from the external load apparatus.

3. The power storage system according to claim 2, wherein the second threshold voltage is set to be a predetermined voltage higher than an operation voltage causing the external load apparatus to be operated, and to be lower than the first threshold voltage.

4. The power storage system according to claim 1, wherein
the first changeover unit has hysteresis characteristics, and compares the voltage of the first storage battery with the first threshold voltage by using the hysteresis characteristics,
in a case where the voltage of the first storage battery exceeds the first threshold voltage, the first changeover unit controls the first switch unit so that the first storage battery is connected to the second storage battery, and
in a case where the first storage battery is connected to the second storage battery, and the voltage of the first storage battery is reduced to a third threshold voltage or lower, the threshold voltage being a predetermined voltage lower than the first threshold voltage, the first changeover unit controls the first switch unit so that the first storage battery is disconnected from the second storage battery.

5. The power storage system according to claim 4, wherein
a hysteresis width between the first threshold voltage and the third threshold voltage in the hysteresis characteristics of the first changeover unit is set to correspond to a second threshold voltage used to control opening and closing of a second switch unit performing switching between an electrical connection state and disconnection state between the first storage battery and the second storage battery, and the external load apparatus.

6. The power storage system according to claim 5, wherein
the third threshold voltage is set to be a predetermined voltage higher than the second threshold voltage.

7. The power storage system according to claim 1, wherein
the first switch unit is provided with a supply circuit that is connected in parallel thereto, and
the supply circuit is configured to prevent a current from flowing through the first storage battery from the second storage battery, and to cause a current to flow toward the external load apparatus from the second storage battery.

8. The power storage system according to claim 1, further comprising:
a DC/DC converter that converts an output voltage from the power generation element into a predetermined voltage so that power is supplied to the first storage battery and the second storage battery.

9. The power storage system according to claim 1, wherein
the power generation element is a low illuminance solar battery which can be used in an environment of a predetermined illuminance or lower.

10. The power storage system according to claim 9, wherein
the solar battery is constituted of solar battery cells which are connected in series to each other.

11. The power storage system according to claim 9 or 10, wherein
the solar battery is a low illuminance dye-sensitized solar battery.

12. A power storage method comprising:
providing a power storage system including a first storage battery that is configured to be supplied with power generated by a power generation element performing environmental power generation and to supply power to an external load apparatus, a second storage battery that is configured to have a capacity larger than a capacity of the first storage battery, and to supply power to the external load apparatus, a first switch unit that performs switching between an electrical connection state and disconnection state between the first storage battery and the second storage battery, and a first changeover unit that compares a voltage of the first storage battery with a predetermined first threshold voltage which is equal to or higher than a voltage causing the external load apparatus to be operated, and controls the first switch unit according to a comparison result;

causing the first changeover unit to control the first switch unit so that the first storage battery is disconnected from the second storage battery, and thus power generated by the power generation element is supplied to only the first storage battery, in a case where the voltage of the first storage battery is equal to or lower than the first threshold voltage; and causing the first changeover unit to control the first switch unit so that the first storage battery is connected to the second storage battery, and thus power is supplied to the second storage, in a case where the voltage of the first storage battery exceeds the first threshold voltage.

\* \* \* \* \*